United States Patent
Lipo et al.

(10) Patent No.: US 10,003,228 B2
(45) Date of Patent: Jun. 19, 2018

(54) INTERIOR PERMANENT MAGNET MACHINE WITH AXIALLY VARYING PERMANENT MAGNET SIZE

(71) Applicant: Wisconsin Alumni Research Foundation, Madison, WI (US)

(72) Inventors: Thomas A. Lipo, Middleton, WI (US); Zhentao Stephen Du, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 309 days.

(21) Appl. No.: 14/835,030

(22) Filed: Aug. 25, 2015

(65) Prior Publication Data
US 2017/0063188 A1    Mar. 2, 2017

(51) Int. Cl.
| H02K 21/12 | (2006.01) |
| H02K 1/27 | (2006.01) |
| H02K 29/03 | (2006.01) |
| H02K 7/18 | (2006.01) |

(52) U.S. Cl.
CPC .......... *H02K 1/2766* (2013.01); *H02K 7/183* (2013.01); *H02K 29/03* (2013.01); *H02K 2213/03* (2013.01)

(58) Field of Classification Search
CPC ..... H02K 7/183; H02K 29/03; H02K 2213/03
USPC ...... 310/156.56, 156, 112, 113, 114, 156.47, 310/156.43, 156.44, 156.45, 156.46, 310/156.37, 156.62, 156.64, 156.68
See application file for complete search history.

(56) References Cited

U.S. PATENT DOCUMENTS

| 7,518,277 B2 | 4/2009 | Nemoto et al. |
| 8,018,109 B2 | 9/2011 | Leonardi et al. |
| 8,368,273 B2 * | 2/2013 | Hino ............ H02K 1/276 310/156.47 |
| 8,536,748 B2 * | 9/2013 | Liang ........... H02K 1/2766 310/156.53 |
| 8,884,485 B2 * | 11/2014 | Jurkovic ........ H02K 1/2766 310/156.47 |

(Continued)

OTHER PUBLICATIONS

Evaluation of the 2007 Toyota Camry Hybrid Synergy Drive System, prepared by Oak Ridge National Laboratory, ORNL/TM-2007/190, Jan. 2008.

(Continued)

*Primary Examiner* — Forrest M Phillips
(74) *Attorney, Agent, or Firm* — Bell & Manning, LLC

(57) ABSTRACT

A rotor includes pole portions, a first permanent magnet, a second permanent magnet, and a third permanent magnet. Each pole portion includes a center, a back, and a front rotor core portion. A first slot is embedded in the center rotor core portion. A second slot is embedded in the back rotor core portion. A third slot is embedded in the front rotor core portion. The center rotor core portion is mounted axially between the front rotor core portion and the back rotor core portion. The permanent magnets are mounted, respectively, in the slots of each pole portion. A maximum length of the first permanent magnet is greater than twice a maximum length of the second permanent magnet. The maximum length of the second permanent magnet is equal to a maximum length of the third permanent magnet. The permanent magnets are aligned relative to a pole axis of each pole portion.

20 Claims, 19 Drawing Sheets

(56) References Cited

U.S. PATENT DOCUMENTS

| | | | | |
|---|---|---|---|---|
| 8,922,084 | B2* | 12/2014 | Nagai | H02K 1/2766 |
| | | | | 310/114 |
| 9,035,522 | B2 | 5/2015 | Liang et al. | |
| 9,197,105 | B2* | 11/2015 | Kogure | H02K 1/2766 |
| 9,306,422 | B2* | 4/2016 | Berkouk | H02K 1/2773 |
| 9,343,933 | B2* | 5/2016 | Isoda | H02K 1/2766 |
| 9,343,937 | B2* | 5/2016 | Nakazono | H02K 1/28 |
| 9,369,016 | B2* | 6/2016 | Herranz Gracia | H02K 1/276 |
| 9,537,361 | B2* | 1/2017 | Hisada | H02K 1/276 |
| 2010/0117475 | A1* | 5/2010 | Leonardi | H02K 1/2766 |
| | | | | 310/156.47 |
| 2013/0285500 | A1* | 10/2013 | Kinashi | H02K 1/276 |
| | | | | 310/156.53 |
| 2015/0001970 | A1* | 1/2015 | Zhang | H02K 21/16 |
| | | | | 310/43 |
| 2015/0069879 | A1 | 3/2015 | Papini et al. | |

OTHER PUBLICATIONS

Zhao et al., Material-Efficient Permanent-Magnet Shape for Torque Pulsation Minimization in SPM Motors for Automotive Applications, IEEE Transactions on Industrial Electronics, vol. 61, No. 10, Jan. 21, 2014, pp. 5779-5787.

Shah et al., Modeling of Novel Permanent Magnet Pole Shape SPM Motor for Reducing Torque Pulsation, IEEE Transactions on Magnetics, vol. 48, No. 11, Nov. 2012, pp. 4626-4629.

Zhao et al., Novel Permanent Magnet Pole Shape for Reducing Cogging Torque and Generating Sinusoidal Back EMF in Surface-mounted PM Motors, The Korean Institute of Electrical Engineers, 7, 2013, pp. 721-722.

\* cited by examiner

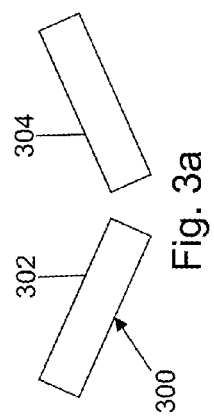
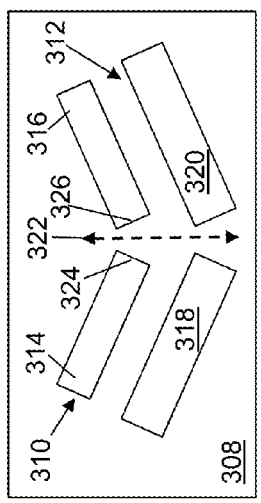
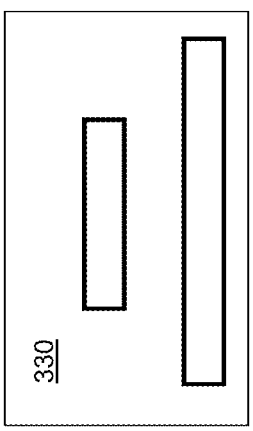
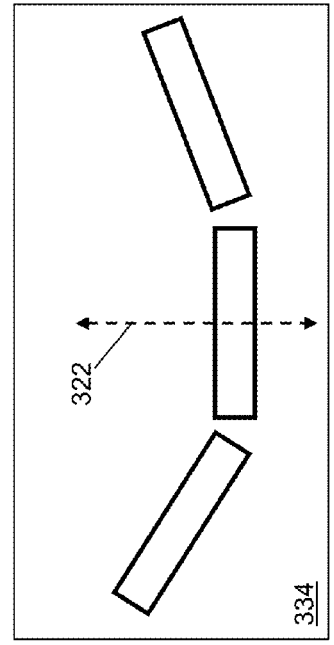
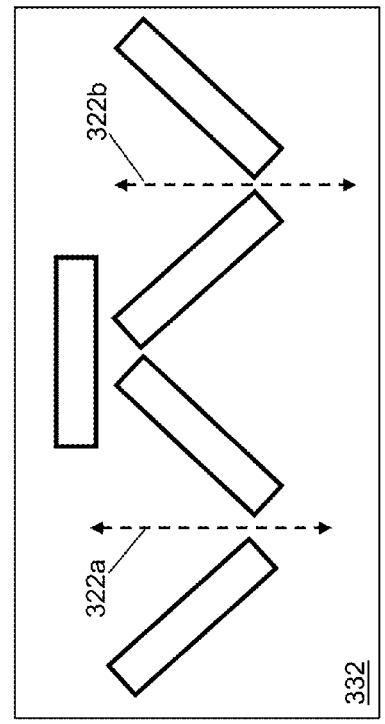

INTERIOR PERMANENT MAGNET MACHINE WITH AXIALLY VARYING PERMANENT MAGNET SIZE

BACKGROUND

Permanent magnet (PM) machines are widely used in industrial applications, wind power generation systems, electric vehicles (EV), and hybrid electric vehicles (HEV). One PM machine type, called interior permanent magnet machines (IPMMs), embeds permanent magnets in the rotor. IPMMs are ideal machines for EV and HEV applications due to the high efficiency, high torque density, high power density, wide constant power range, wide speed range, and high reliability. The main drawback of IPMMs is the use of rare earth materials for the magnets, which have limited sources and are increasing in cost.

Another issue when designing an IPMM is an amount of a pulsating torque associated with an average torque production. The pulsating torque of IPMMs results from a cogging torque and a ripple torque. The cogging torque is due to the interaction between the rotor PMs and a stator reluctance at zero stator excitation. The ripple torque is due to the stator electrical loading and the rotor magnetic loading based on the interaction between the stator magnetomotive force (MMF) and the rectangular rotor PM flux distribution. The ripple torque also results from a saliency due to the interaction between the stator MMF and a non-uniform rotor permeance. The pulsating torque creates problems such as mechanical resonance, structural vibration, speed ripple and acoustic noise, drive component damage, and low machine performance under speed or position control. Significant amounts of vibration and mechanical resonant load issues can cause mechanical breakdown of the coupling shaft, resulting in the replacement of an entire shaft system at high expense.

SUMMARY

In an example embodiment, a rotor of an electric machine includes, but is not limited to, a plurality of pole portions, a first permanent magnet, a second permanent magnet, and a third permanent magnet. The plurality of pole portions form a cylinder with a center axial core. The central axis is defined through a center of the center axial core. Each pole portion includes, but is not limited to, a center rotor core portion, a back rotor core portion, and a front rotor core portion.

The center rotor core portion includes, but is not limited to, a first front face, a first back face, a first top face, and a first bottom face. The first back face faces in a direction opposite to the first front face. A first slot is formed through the first front face and the first back face between the first top face and the first bottom face.

The back rotor core portion includes, but is not limited to, a second front face, a second back face, a second top face, and a second bottom face. The second back face faces in a direction opposite to the second front face. A second slot is formed through the second front face and the second back face between the second top face and the second bottom face.

The front rotor core portion includes, but is not limited to, a third front face, a third back face, a third top face, and a third bottom face. The third back face faces in a direction opposite to the third front face. A third slot is formed through the third front face and the third back face between the third top face and the third bottom face.

The front rotor core portion is mounted to the center rotor core portion axially so that the third back face mounts to the first front face. The back rotor core portion is mounted to the center rotor core portion axially so that the first back face mounts to the second front face.

The first permanent magnet is mounted in the first slot of each pole portion. The second permanent magnet is mounted in the second slot of each pole portion. The third permanent magnet is mounted in the third slot of each pole portion. A maximum length of the first permanent magnet that is parallel to the central axis is greater than twice a maximum length of the second permanent magnet that is parallel to the central axis. The maximum length of the second permanent magnet is equal to a maximum length of the third permanent magnet that is parallel to the central axis. An edge of the first permanent magnet, the second permanent magnet, and the third permanent magnet is aligned relative to a pole axis of each pole portion that is parallel to the central axis.

In an example embodiment, an electric machine includes, but is not limited to, a rotor and a stator. The rotor includes, but is not limited to, a plurality of pole portions, a first permanent magnet, a second permanent magnet, and a third permanent magnet. The plurality of pole portions form a cylinder with a center axial core. The central axis is defined through a center of the center axial core. Each pole portion includes, but is not limited to, a center rotor core portion, a back rotor core portion, and a front rotor core portion.

The center rotor core portion includes, but is not limited to, a first front face, a first back face, a first top face, and a first bottom face. The first back face faces in a direction opposite to the first front face. A first slot is formed through the first front face and the first back face between the first top face and the first bottom face.

The back rotor core portion includes, but is not limited to, a second front face, a second back face, a second top face, and a second bottom face. The second back face faces in a direction opposite to the second front face. A second slot is formed through the second front face and the second back face between the second top face and the second bottom face.

The front rotor core portion includes, but is not limited to, a third front face, a third back face, a third top face, and a third bottom face. The third back face faces in a direction opposite to the third front face. A third slot is formed through the third front face and the third back face between the third top face and the third bottom face.

The front rotor core portion is mounted to the center rotor core portion axially so that the third back face mounts to the first front face. The back rotor core portion is mounted to the center rotor core portion axially so that the first back face mounts to the second front face.

The first permanent magnet is mounted in the first slot of each pole portion. The second permanent magnet is mounted in the second slot of each pole portion. The third permanent magnet is mounted in the third slot of each pole portion. A maximum length of the first permanent magnet that is parallel to the central axis is greater than twice a maximum length of the second permanent magnet that is parallel to the central axis. The maximum length of the second permanent magnet is equal to a maximum length of the third permanent magnet that is parallel to the central axis. An edge of the first permanent magnet, the second permanent magnet, and the third permanent magnet is aligned relative to a pole axis of each pole portion that is parallel to the central axis.

The stator includes, but is not limited to, a plurality of teeth about which windings are wound, wherein the stator is mounted radially relative to the first top face, the second top face, and the third top face of each pole portion. An air gap separates the plurality of teeth from the first top face, the second top face, and the third top face of each pole portion.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 3a-3e show permanent magnet structures that may be associated with each pole portion of the rotor of the electrical machine of FIG. 1 in accordance with illustrative embodiments.

DETAILED DESCRIPTION

Figure 1:
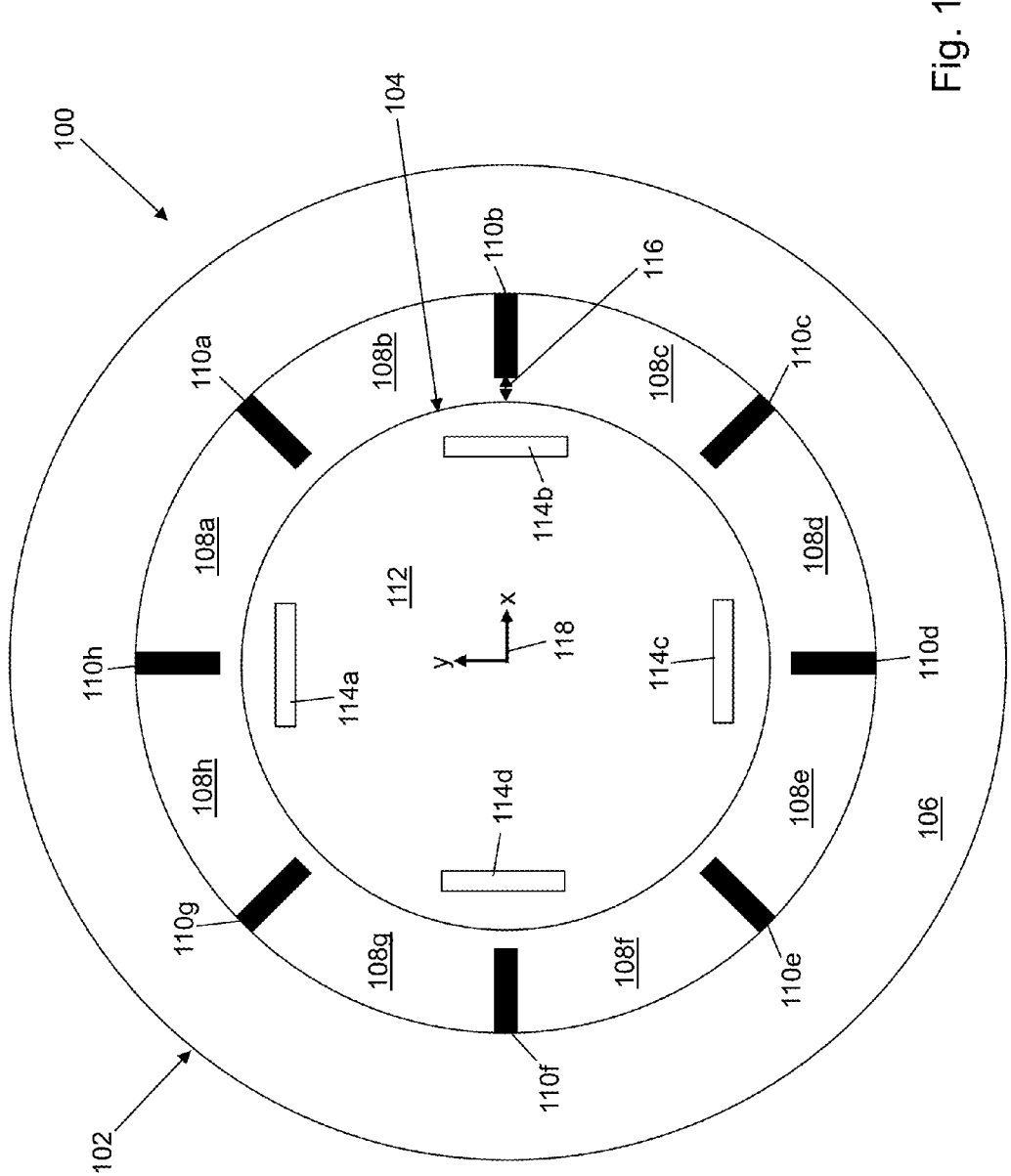
FIG. 1 shows a front view of an electrical machine in accordance with an illustrative embodiment.

Referring to FIG. 1, a front view of an electrical machine 100 is shown in accordance with an illustrative embodiment. Electrical machine 100 may include a stator 102 and a rotor 104. In the illustrative embodiment, electrical machine 100 is a three-phase machine that can be configured as a generator or as a motor as understood by a person of skill in the art. In alternative embodiments, electrical machine 100 can be configured to support a fewer or a greater number of phases. Electrical machine 100 is an interior permanent magnet machine (IPMM). In the illustrative embodiment, rotor 104 is mounted radially within stator 102 separated by an air gap 116. In an alternative embodiment, rotor 104 may be mounted exterior to stator 102. Electrical machine 100 may include a plurality of rotors and/or a plurality of stators.

Use of directional terms, such as top, bottom, right, left, front, back, upper, lower, horizontal, vertical, behind, etc. are merely intended to facilitate reference to the various surfaces of the described structures relative to the orientations shown in the drawings and are not intended to be limiting in any manner unless otherwise indicated.

As used in this disclosure, the term "mount" includes join, unite, connect, couple, abut, hang, hold, affix, attach, fasten, bind, paste, secure, bolt, screw, rivet, pin, nail, clasp, clamp, cement, fuse, solder, weld, glue, form over, slide together, layer, and other like terms. The phrases "mounted on" and "mounted to" include any interior or exterior portion of the element referenced. These phrases also encompass direct mounting (in which the referenced elements are in direct contact) and indirect mounting (in which the referenced elements are not in direct contact, but are mounted together via intermediate elements). Elements referenced as mounted to each other herein may further be integrally formed together, for example, using a molding process as understood by a person of skill in the art. As a result, elements described herein as being mounted to each other need not be discrete structural elements. The elements may be mounted permanently, removably, or releasably.

Electrical machine 100 may be used in various orientations. An x-y-z coordinate system 118 includes an x-axis, a y-axis, and a z-axis (shown referring to FIG. 2) to form a three-dimensional (3D) orthogonal system. The x-axis and the y-axis are perpendicular to each other and parallel to a plane defined by a front face of electrical machine 100. The z-axis is perpendicular to the x-axis and the y-axis. A central axis is parallel to the z-axis. The central axis extends through a center of rotor 104. Rotor 104 mounts to a shaft (not shown) such rotor 104 rotates with the shaft. The central axis extends through a center of the shaft. When electrical machine is acting as a motor, rotor 104 rotates the shaft thereby converting electrical energy to mechanical energy. When electrical machine is acting as a generator, the shaft rotates rotor 104 thereby converting mechanical energy to electrical energy. Stator 102 and rotor 104 are mounted radially around the shaft when electrical machine 100 is mounted to the shaft.

Stator 102 may include a stator yoke 106, a plurality of winding slots, and a plurality of teeth. In the illustrative embodiment, stator yoke 106 has a generally circular cross portion with a hollow core sized to accommodate rotor 104 that rotates within stator 102. Stator 102 may be cast or formed of laminations stacked in an axial direction. The laminations may be punched or laser cut. Stator 102 may be formed of a ferromagnetic material such as lamination steel, iron, cobalt, nickel, etc.

The plurality of teeth and stator yoke 106 define sides of the plurality of winding slots. The plurality of winding slots open towards rotor 104 and may have various sizes and shapes based on windings wound through each winding slot of the plurality of winding slots and based on a winding configuration (e.g., distributed or concentrated). The windings are wound about the plurality of teeth. Electrical signals are induced in the windings or are input to the windings depending on whether or not electrical machine 100 is operating as a generator or a motor as understood by a person of skill in the art. The electrical signals may have different phases that are wound to provide a specific phase and current direction in a specific winding slot of the plurality of winding slots as understood by a person of skill in the art. Stator 102 may have any number of winding slots selected in association with a number of pole portions of rotor 104.

In the illustrative embodiment of FIG. 1, stator 102 includes eight slots such that the plurality of winding slots include a first winding slot 108*a*, a second winding slot 108*b*, a third winding slot 108*c*, a fourth winding slot 108*d*, a fifth winding slot 108*e*, a sixth winding slot 108*f*, a seventh winding slot 108*g*, and an eighth winding slot 108*h*.

Stator 102 includes eight teeth distributed evenly around stator yoke 106 to define boundaries for the winding slots. The plurality of teeth include a first tooth 110*a*, a second tooth 110*b*, third tooth 110*c*, a fourth tooth 110*d*, a fifth tooth 110*e*, a sixth tooth 110*f*, a seventh tooth 110*g*, and an eighth tooth 110*h*. The plurality of teeth extend from stator yoke 106 towards rotor 104 and may have various sizes and shapes as understood by a person of skill in the art.

Rotor 104 may include a rotor core 112 and a plurality of permanent magnets embedded within rotor core 112. In the illustrative embodiment, rotor core 112 has a generally circular cross portion with a hollow core sized to accommodate the shaft that rotates with rotor 104. Air gap 116 is defined between an end of each tooth of the plurality of teeth and an edge surface of rotor core 112. Rotor core 112 may be cast or formed of laminations stacked in an axial direction. The laminations may be punched or laser cut. Rotor core 112 may be formed of a ferromagnetic material such as lamination steel, iron, cobalt, nickel, etc.

Rotor 104 includes a plurality of pole portions distributed evenly around rotor core112 with a permanent magnet structure associated with each pole portion. As a result, the plurality of pole portions are distributed at equal angles around the circumference of rotor core 112 though embedded within rotor core 112. In the illustrative embodiment of FIG. 1, rotor 104 includes four pole portions and each permanent magnet structure includes a single rectangular permanent magnet oriented with a pole arc angle of 180 electrical degrees as discussed further below. For example, in the illustrative position shown in FIG. 1, a first permanent magnet 114*a* is positioned at 90 degrees, a second permanent magnet 114*b* is positioned at 0 degrees, a third permanent magnet 114*c* is positioned at −90 degrees, and a fourth permanent magnet 114*d* is positioned at 180 degrees relative to the x-axis. The number of rotor poles may depend on the number of stator phases supported by electrical machine 100. In the arrangement shown in the illustrative four-pole embodiment of FIG. 1, first permanent magnet 114*a* has an opposite N-S polarity relative to third permanent magnet 114*c*, and second permanent magnet 114*b* has an opposite N-S polarity relative to fourth permanent magnet 114*d*. First permanent magnet 114*a*, second permanent magnet 114*b*, third permanent magnet 114*c*, and fourth permanent magnet 114*d* are permanent magnets that may be formed of rare earth magnets, such as neodymium and dysprosium, of ferrite based magnets, etc.

Figure 2:
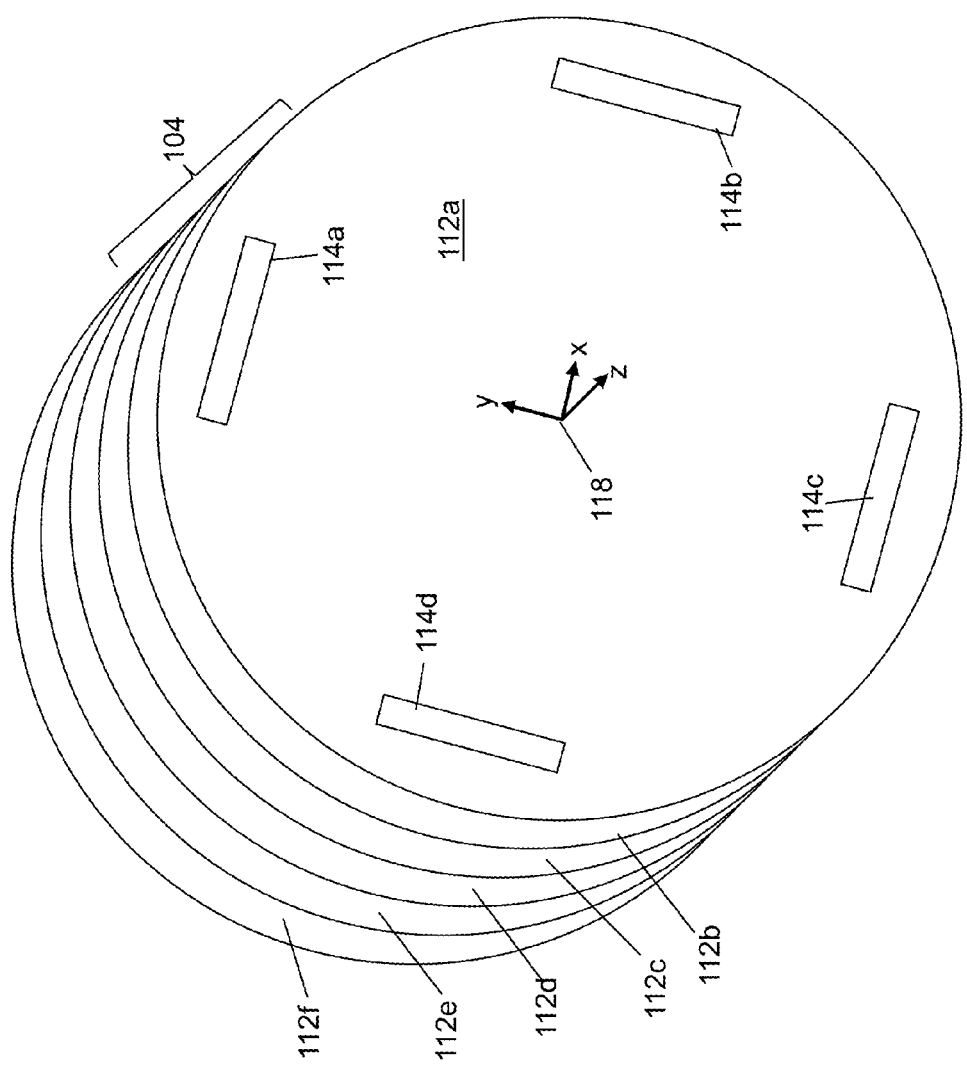
FIG. 2 shows a perspective view of a rotor of the electrical machine of FIG. 1 in accordance with an illustrative embodiment.

Referring to FIG. 2, a perspective view of rotor 104 is shown. Rotor 104 may include a plurality of rotor core stacks mounted to each other axially. In the illustrative embodiment of FIG. 1, rotor 104 includes 6 stacks, a first rotor core stack 112*a*, a second rotor core stack 112*b*, a third rotor core stack 112*c*, a fourth rotor core stack 112*d*, a fifth rotor core stack 112*e*, and a sixth rotor core stack 112*f*. Rotor 104 includes at least three stacks with a center rotor core stack, at least one front stack mounted to a front face of the center rotor core stack, and at least one back stack mounted to a back face of the center rotor core stack. The z-axis extends through a center of each stack of the plurality of rotor core stacks. Each rotor core stack includes the plurality of pole portions distributed evenly around the respective rotor core 112 with a permanent magnet structure associated with each pole portion. The plurality of rotor core stacks are formed of laminations.

Referring to FIGS. 3*a*-3*e*, the permanent magnet structure associated with each pole portion may include one or more permanent magnets having various shapes and sizes and oriented at various distances from each other and at the same or different pole arc angles. For example, referring to FIG. 3*a*, a first permanent magnet structure 300 is a v-shaped permanent magnet that includes a first v-arm permanent magnet 302 and a second v-arm permanent magnet 304. The pole arc angle is the angle formed between first v-arm permanent magnet 302 and second v-arm permanent magnet 304. In the arrangement shown in FIG. 3*a*, first v-arm permanent magnet 302 has an opposite N-S polarity relative to second v-arm permanent magnet 304.

Referring to FIG. 3*b*, a second permanent magnet structure 308 includes a first permanent magnet structure 310 and a second permanent magnet structure 312. First permanent magnet structure 310 is a v-shaped permanent magnet that includes a first v-arm permanent magnet 314 and a second v-arm permanent magnet 316. Second permanent magnet structure 312 is a v-shaped permanent magnet that includes a third v-arm permanent magnet 318 and a fourth v-arm permanent magnet 320.

In the illustrative embodiment of FIG. 3*b*, first permanent magnet structure 310 and second permanent magnet structure 312 are aligned along a center radial axis 322. "Aligned along" indicates that an edge of each permanent magnet of the associated permanent magnet structure is positioned equidistant from center radial axis 322. Center radial axis 322 is further in the x-y plane of x-y-z coordinate system 118. For example, a first distance from a right edge 324 of first v-arm permanent magnet 314 to center radial axis 322 measured perpendicular to center radial axis 322 and a second distance from a left edge 326 of second v-arm permanent magnet 316 measured along the same perpendicular to center radial axis 322 are equal.

Referring to FIG. 3c, a third permanent magnet structure 330 is shown in accordance with an illustrative embodiment. Referring to FIG. 3d, a fourth permanent magnet structure 332 is shown in accordance with an illustrative embodiment. As shown referring to FIG. 3d, a plurality of center radial axes, 322a, and 322 may be defined based on the arrangement of the magnets. Referring to FIG. 3e, a fifth permanent magnet structure 334 is shown in accordance with an illustrative embodiment.

Figure 4:
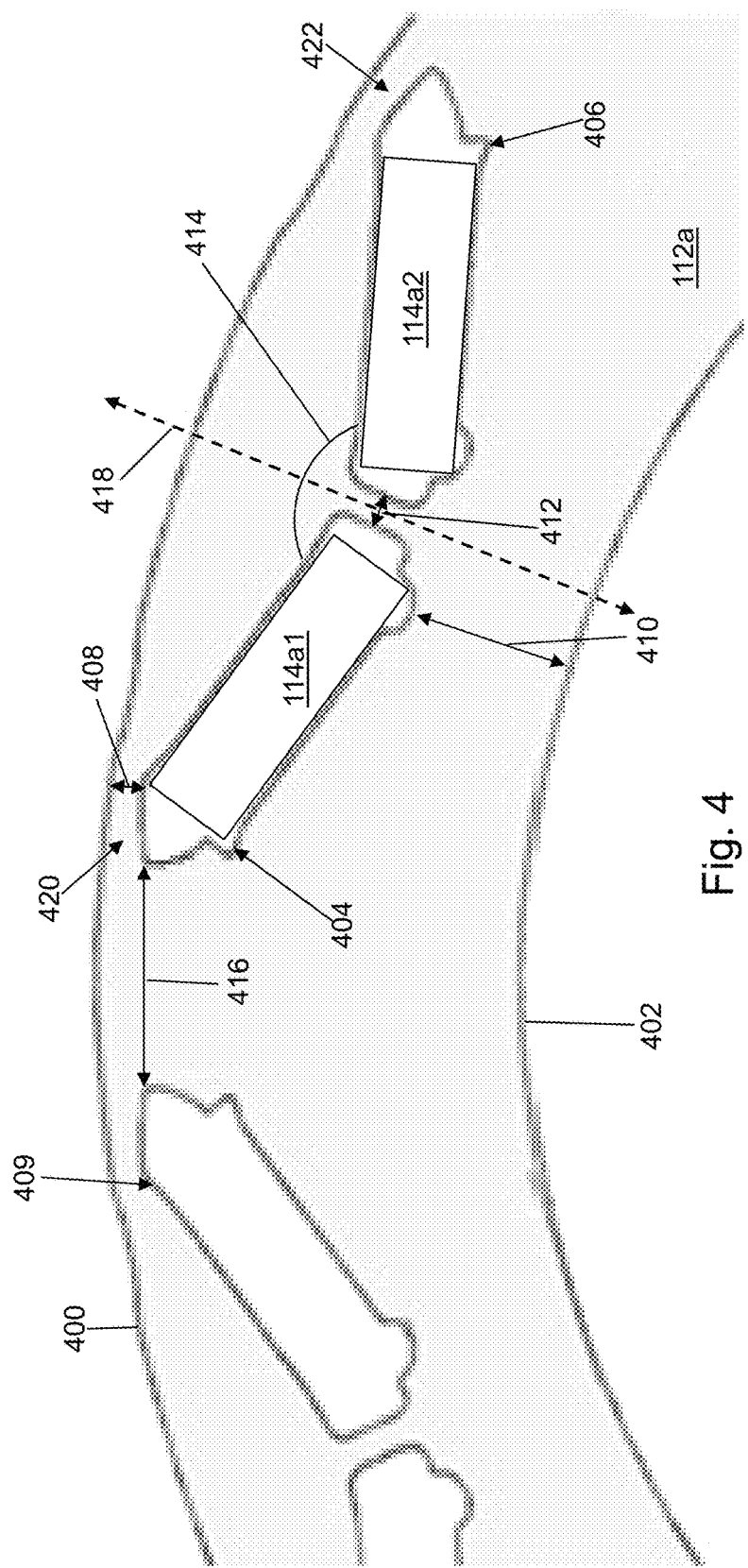
FIG. 4 shows a front view of a portion of a rotor of an electrical machine in accordance with an illustrative embodiment.

Referring to FIG. 4, approximately 1.5 pole portions of first rotor core stack 112a are shown in accordance with an illustrative embodiment. In the illustrative embodiment of FIG. 4, first rotor core stack 112a includes a top face 400 and a bottom face 402. A first pole portion of first rotor core stack 112a includes a first slot 404 and a second slot 406. First slot 404 and second slot 406 are symmetrical to each other about a center radial axis 418 of the first pole portion. Center radial axis 418 is in the x-y plane of x-y-z coordinate system 118 and extends through a center of a front face of the first pole portion.

A first v-arm permanent magnet 114a1 is mounted in first slot 404. A second v-arm permanent magnet 114a2 is mounted in second slot 406. First slot 404 and second slot 406 are sized to enclose first v-arm permanent magnet 114a1 and second v-arm permanent magnet 114a2, respectively. First v-arm permanent magnet 114a1 has an opposite N-S polarity relative to second v-arm permanent magnet 114a2. First v-arm permanent magnet 114a1 and second v-arm permanent magnet 114a2 are permanent magnets that may be formed of rare earth magnets, such as neodymium and dysprosium, of ferrite based magnets, etc.

There may be space between various walls of first slot 404 and first v-arm permanent magnet 114a1 and between various walls of second slot 406 and second v-arm permanent magnet 114a2. Air or a non-conducting filler material may fill all or a portion of the space so that first v-arm permanent magnet 114a1 and second v-arm permanent magnet 114a2 do not move once mounted to first rotor core stack 112a. The size and shape of first slot 404 and of second slot 406 may be optimized as understood by a person of skill in the art.

A first saturable bridge 420 and a second saturable bridge 422 are defined between first slot 404 and second slot 406, respectively, and top face 400 as understood by a person of skill in the art. A saturable bridge height 408 is defined between a closest edge of first slot 404 and top face 400. If stator 102 is mounted interior to rotor 104, saturable bridge height 408 may be defined relative to bottom face 402. A minimum slot core height 410 is defined between a closest edge of first slot 404 and bottom face 402. If stator 102 is mounted interior to rotor 104, minimum slot core height 410 may be defined relative to top face 400. An interior bridge width 412 is defined between closest edges of first slot 404 and second slot 406. Interior bridge width 412 may be zero for a continuous permanent magnet such as first permanent magnet 114a and second permanent magnet structure 306.

A pole arc angle 414 is defined between first slot 404 and second slot 406 on a side closest to top face 400. If stator 102 is mounted interior to rotor 104, pole arc angle 414 may be defined between first slot 404 and second slot 406 on a side closest to bottom face 402. As already discussed, pole arc angle 414 may be 180 degrees. Pole arc angle 414 further may be less than 180 degrees and greater than 90 degrees.

An adjacent pole slot distance 416 is defined between a closest edge of first slot 404 and a closest edge of a third slot 409 of an adjacent pole portion. In the illustrative embodiment, each pole portion of first rotor core stack 112a has the same size, shape, and arrangement of slots.

Figure 5:
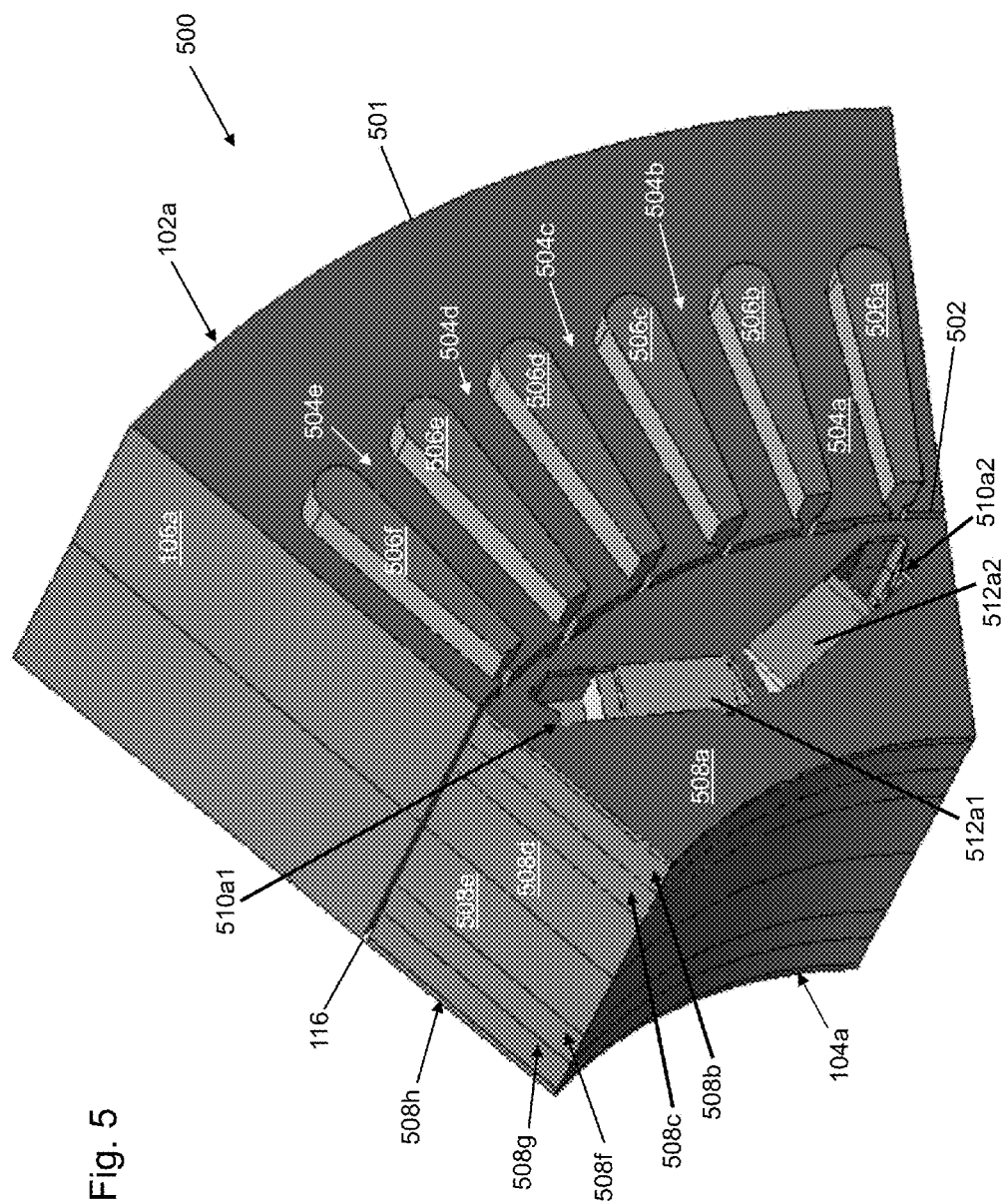
FIG. 5 shows a perspective view of a portion of an electrical machine in accordance with an illustrative embodiment.

Referring to FIG. 5, a front perspective view of an electrical machine pole portion 500 is shown in accordance with an illustrative embodiment. Electrical machine pole portion 500 may form ⅛ of a full electrical machine. Thus, the full electrical machine includes eight pole portions. Electrical machine pole portion 500 may include a stator pole portion 102a and a rotor pole portion 104a. Stator pole portion 102a may include a stator yoke portion 106a, a stator top face 501, a stator bottom face 502, a plurality of pole portion teeth, and a plurality of pole portion windings. The plurality of pole portion teeth may include a first tooth 504a, a second tooth 504b, a third tooth 504c, a fourth tooth 504d, a fifth tooth 504e, and a sixth tooth 504f. Thus, the full electrical machine includes 48 teeth about which windings are wound. Stator bottom face 502 is formed by an edge face of each of the plurality of pole portion teeth. The plurality of pole portion windings are mounted in a plurality of winding slots that are not visible in FIG. 5. The plurality of pole portion windings may include first windings 506a, second windings 506b, third windings 506c, fourth windings 506d, fifth windings 506e, and sixth windings 506f.

Rotor pole portion 104a may include a plurality of rotor core stack portions. In the illustrative embodiment, rotor pole portion 104a includes eight rotor core stack portions that each form a rotor pole portion. In the illustrative embodiment, rotor pole portion 104a includes a first rotor core stack portion 508a, a second rotor core stack portion 508b, a third rotor core stack portion 508c, a fourth rotor core stack portion 508d, a fifth rotor core stack portion 508e, a sixth rotor core stack portion 508f, a seventh rotor core stack portion 508g, and an eighth rotor core stack portion 508h. First rotor core stack portion 508a includes a first permanent magnet slot 510a1 and a second permanent magnet slot 510a2. A first permanent magnet 512a1 is mounted in first permanent magnet slot 510a1. A second permanent magnet 512a2 is mounted in second permanent magnet slot 510a2. In the illustrative embodiment, fourth rotor core stack portion 508d is identical to fifth rotor core stack portion 508e; third rotor core stack portion 508c is identical to sixth rotor core stack portion 508f; second rotor core stack portion 508b is identical to seventh rotor core stack portion 508g; and first rotor core stack portion 508a is identical to eighth rotor core stack portion 508h.

Figure 6:
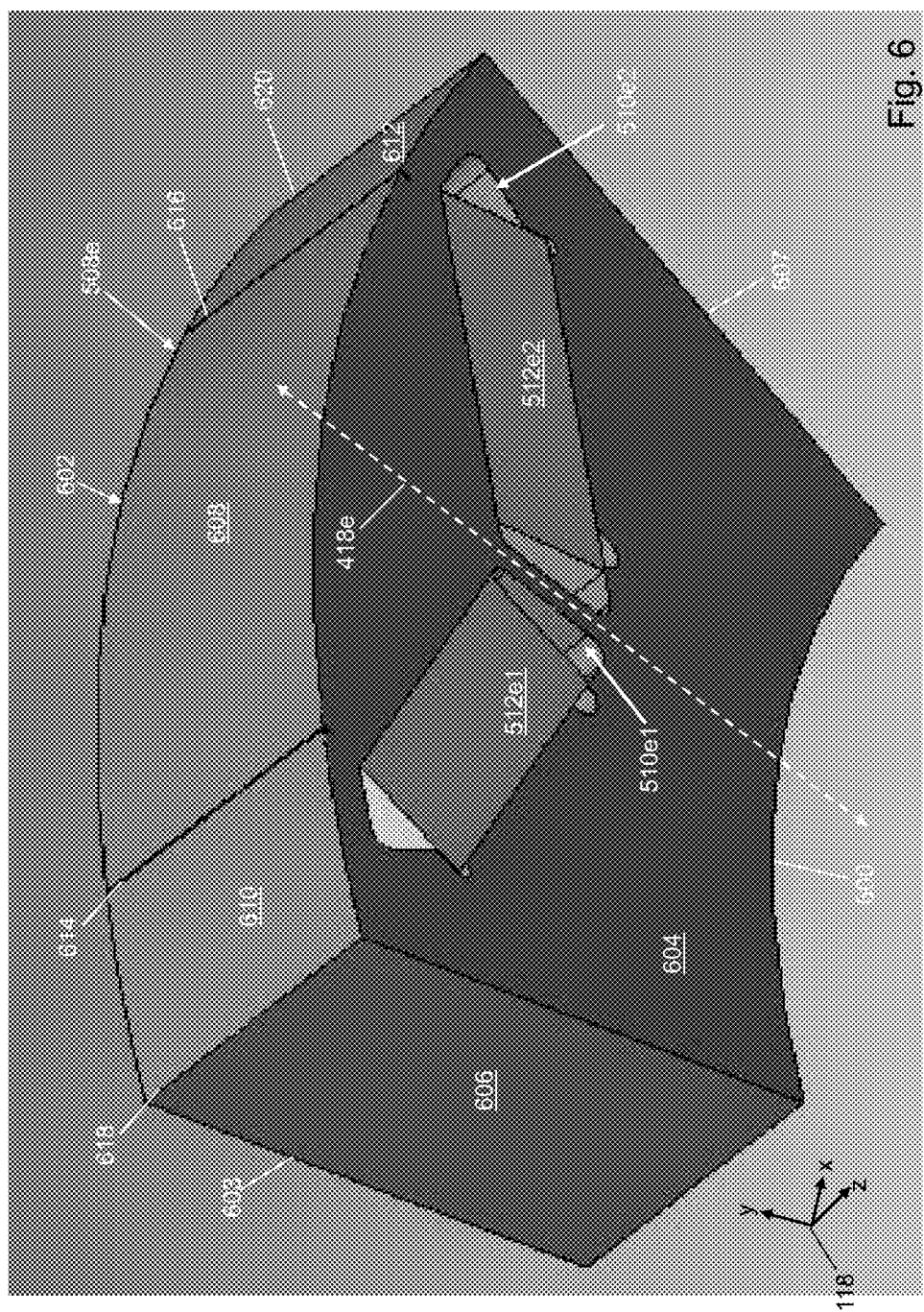
FIG. 6 shows a perspective view of a fifth rotor core stack portion of the portion of the electrical machine of FIG. 5 in accordance with an illustrative embodiment.

Referring to FIG. 6, a top, front perspective view of fifth rotor core stack portion 508e is shown in accordance with an illustrative embodiment. Fifth rotor core stack portion 508e may include a first front face 604, a first back face 603 (only an edge is visible), a first top face 602, a first bottom face 600, a first left side face 606, and a first right side face 607 (only an edge is visible). First back face 603 faces in a direction opposite to first front face 604. First top face 602, first bottom face 600, first left side face 606, and first right side face 607 extend between first front face 604 and first back face 603. First front face 604, first back face 603, first left side face 606, and first right side face 607 are generally flat. First front face 604 and first back face 603 are parallel to a plane defined by the x-y axes of x-y-z coordinate system 118. First left side face 606 and first right side face 607 are generally rectangular and are parallel to a plane defined by the y-z axes of x-y-z coordinate system 118. First top face 602 and first bottom face 600 curve radially about the z-axis of x-y-z coordinate system 118.

A first permanent magnet slot 510e1 is formed through first front face 604 and first back face 603 between first top face 602, first bottom face 600, first left side face 606, and first right side face 607. A second permanent magnet slot 510e2 is formed through first front face 604 and first back face 603 between first top face 602, first bottom face 600, first left side face 606, and first right side face 607. First permanent magnet slot 510e1 and second permanent magnet slot 510e2 are arranged similar to first slot 404 and second slot 406 of the first pole portion of first rotor core stack 112a shown with reference to FIG. 4. First permanent magnet slot 510e1 and second permanent magnet slot 510e2 are mirror images of each other when rotated about a center radial axis 418e of fifth rotor core stack portion 508e.

A first permanent magnet 512e1 and a second permanent magnet 512e2 are mounted in first permanent magnet slot 510e1 and second permanent magnet slot 510e2, respectively, similar to first v-arm permanent magnet 114a1 and second v-arm permanent magnet 114a2 shown with reference to FIG. 4. First permanent magnet 512e1 and second permanent magnet 512e2 form a v-shaped permanent magnet structure.

First top face 602 may include a top face center portion 608, a top face left portion 610, and a top face right portion 612 formed between first front face 604 and first back face 603. A left notch 614 is cut into first top face 602 between top face center portion 608 and top face left portion 610. A right notch 616 is cut into first top face 602 between top face center portion 608 and top face right portion 612. Top face left portion 610 extends between left notch 614 and a left edge 618. Top face right portion 612 extends between right notch 616 and a right edge 620.

Figure 7:
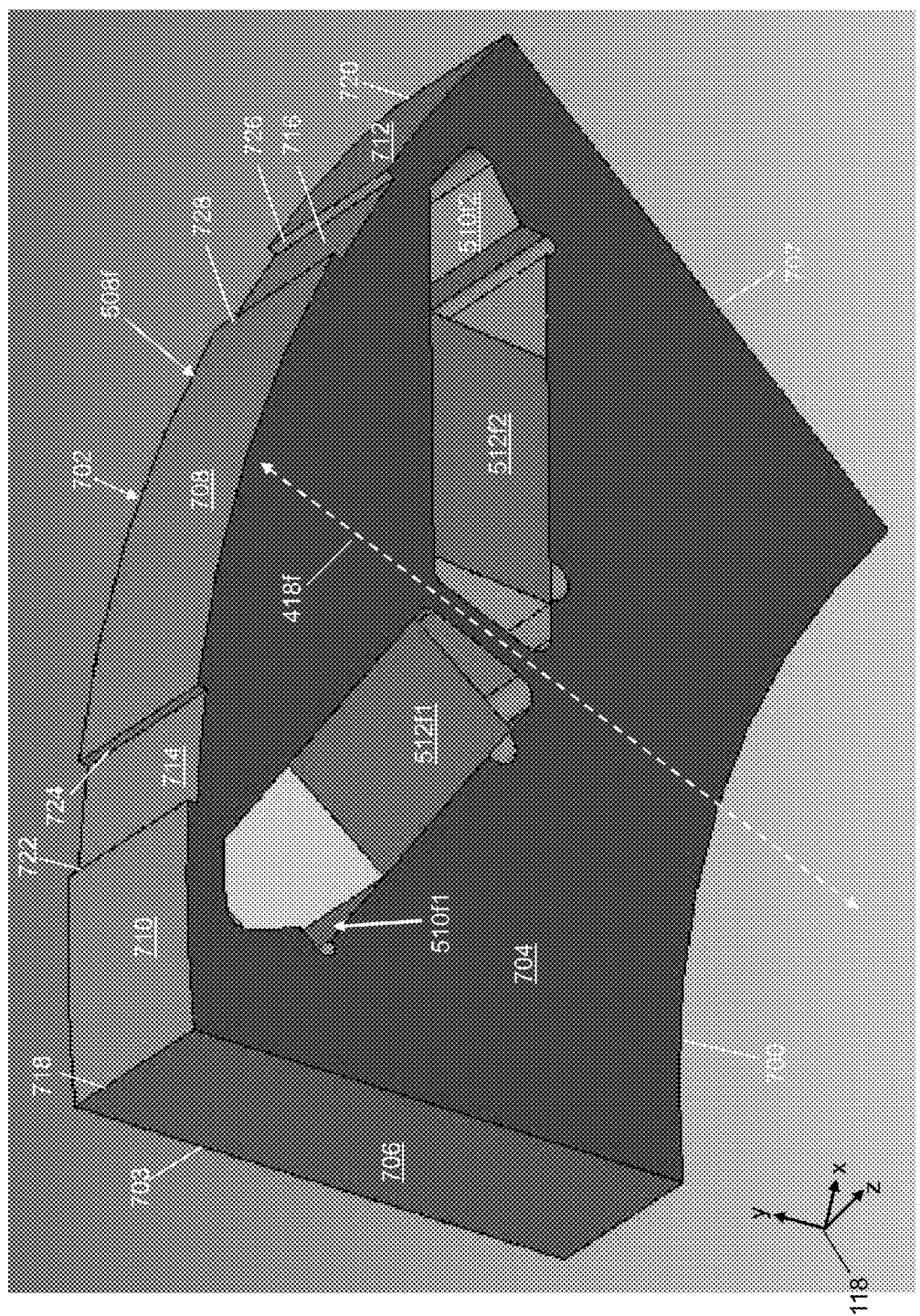
FIG. 7 shows a perspective view of a sixth rotor core stack portion of the portion of the electrical machine of FIG. 5 in accordance with an illustrative embodiment.

Referring to FIG. 7, a top, front perspective view of sixth rotor core stack portion 508f is shown in accordance with an illustrative embodiment. Sixth rotor core stack portion 508f may include a second front face 704, a second back face 703 (only an edge is visible), a second top face 702, a second bottom face 700, a second left side face 706, and a second right side face 707 (only an edge is visible). Second back face 703 faces in a direction opposite to second front face 704. Second top face 702, second bottom face 700, second left side face 706, and second right side face 707 extend between second front face 704 and second back face 703. Second front face 704, second back face 703, second left side face 706, and second right side face 707 are generally flat. Second front face 704 and second back face 703 are parallel to a plane defined by the x-y axes of x-y-z coordinate system 118. Second left side face 706 and second right side face 707 are generally rectangular and are parallel to a plane defined by the y-s axes of x-y-z coordinate system 118. Second top face 702 and second bottom face 700 curve radially about the z-axis of x-y-z coordinate system 118.

A third permanent magnet slot 510f1 is formed through second front face 704 and second back face 703 between second top face 702, second bottom face 700, second left side face 706, and second right side face 707. A fourth permanent magnet slot 510f2 is formed through second front face 704 and second back face 703 between second top face 702, second bottom face 700, second left side face 706, and second right side face 707. Third permanent magnet slot 510f1 and fourth permanent magnet slot 510f2 are arranged similar to first slot 404 and second slot 406 of the first pole portion of first rotor core stack 112a shown with reference to FIG. 4. Third permanent magnet slot 510f1 and fourth permanent magnet slot 510f2 are mirror images of each other when rotated about a center radial axis 418f of sixth rotor core stack portion 508f.

A third permanent magnet 512f1 and a fourth permanent magnet 512f2 are mounted in third permanent magnet slot 510f1 and fourth permanent magnet slot 510f2, respectively, similar to first v-arm permanent magnet 114a1 and second v-arm permanent magnet 114a2 shown with reference to FIG. 4. Third permanent magnet 512f1 and fourth permanent magnet 512f2 form a v-shaped permanent magnet structure.

Second top face 702 may include a top face center portion 708, a top face left portion 710, and a top face right portion 712 formed between second front face 704 and second back face 703. A left notch 714 is cut into second top face 702 between top face center portion 708 and top face left portion 710. A right notch 716 is cut into second top face 702 between top face center portion 708 and top face right portion 712. Left notch 714 may be formed by a first left notch wall 722 and a second left notch wall 724. Top face left portion 710 extends between first left notch wall 722 and a left edge 718. Right notch 716 may be formed by a first right notch wall 726 and a second right notch wall 728. Top face right portion 712 extends between first right notch wall 726 and a right edge 720. Top face center portion 708 extends between second left notch wall 724 and second right notch wall 728. Left notch 714 and right notch 716 have the same width and depth and shape. Left notch 714 and right notch 716 may form a channel that has a v-shape, a ∪-shape, a ⌐-shape, etc.

Figure 8:
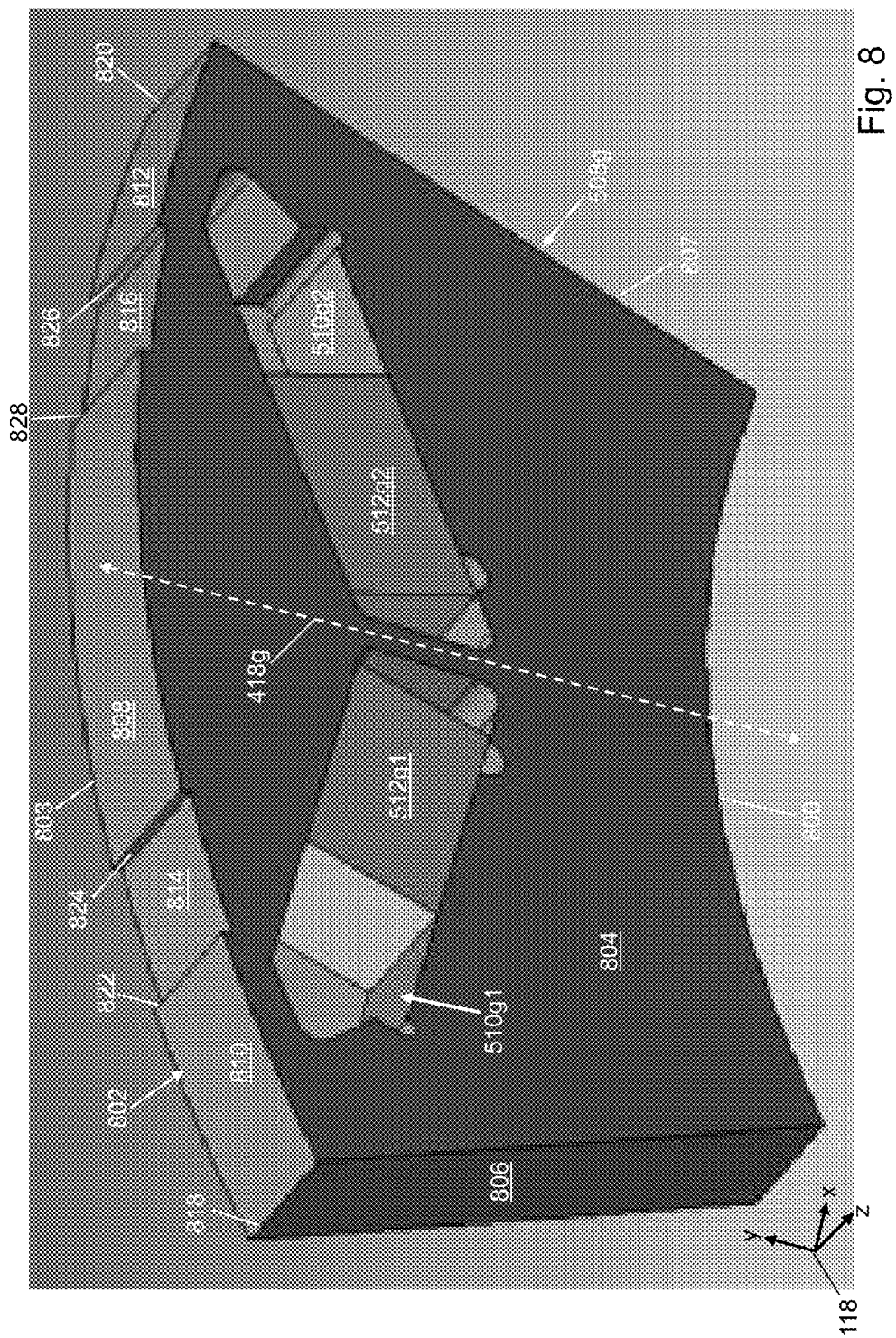
FIG. 8 shows a perspective view of a seventh rotor core stack portion of the portion of the electrical machine of FIG. 5 in accordance with an illustrative embodiment.

Referring to FIG. 8, a top, front perspective view of seventh rotor core stack portion 508g is shown in accordance with an illustrative embodiment. Seventh rotor core stack portion 508g may include a third front face 804, a third back face 803 (only an edge is visible), a third top face 802, a third bottom face 800, a third left side face 806, and a third right side face 807 (only an edge is visible). Third back face 803 faces in a direction opposite to third front face 804. Third top face 802, third bottom face 800, third left side face 806, and third right side face 807 extend between third front face 804 and third back face 803. Third front face 804, third back face 803, third left side face 806, and third right side face 807 are generally flat. Third front face 804 and third back face 803 have a truncated pie shape and are parallel to a plane defined by the x-y axes of x-y-z coordinate system 118. Third left side face 806 and third right side face 807 are generally rectangular and are parallel to a plane defined by the y-s axes of x-y-z coordinate system 118. Third top face 802 and third bottom face 800 curve radially about the z-axis of x-y-z coordinate system 118.

A fifth permanent magnet slot 510g1 is formed through third front face 804 and third back face 803 between third top face 802, third bottom face 800, third left side face 806, and third right side face 807. A sixth permanent magnet slot 510g2 is formed through third front face 804 and third back face 803 between third top face 802, third bottom face 800, third left side face 806, and third right side face 807. Fifth permanent magnet slot 510g1 and sixth permanent magnet slot 510g2 are arranged similar to first slot 404 and second slot 406 of the first pole portion of first rotor core stack 112a shown with reference to FIG. 4. Fifth permanent magnet slot 510g1 and sixth permanent magnet slot 510g2 are mirror images of each other when rotated about a center radial axis 418g of seventh rotor core stack portion 508g.

A fifth permanent magnet 512g1 and a sixth permanent magnet 512g2 are mounted in fifth permanent magnet slot 510g1 and sixth permanent magnet slot 510g2, respectively, similar to first v-arm permanent magnet 114a1 and second v-arm permanent magnet 114a2 shown with reference to FIG. 4. Fifth permanent magnet 512g1 and sixth permanent magnet 512g2 form a v-shaped permanent magnet structure.

Third top face 802 may include a top face center portion 808, a top face left portion 810, and a top face right portion 812 formed between third front face 804 and third back face 803. A left notch 814 is cut into third top face 802 between top face center portion 808 and top face left portion 810. A right notch 816 is cut into third top face 802 between top face center portion 808 and top face right portion 812. Left notch 814 may be formed by a first left notch wall 822 and a second left notch wall 824. Top face left portion 810 extends between first left notch wall 822 and a left edge 818. Right notch 816 may be formed by a first right notch wall 826 and a second right notch wall 828. Top face right portion 812 extends between first right notch wall 826 and a right edge 820. Top face center portion 808 extends between second left notch wall 824 and second right notch wall 828. Left notch 814 and right notch 816 have the same width and depth and shape. Left notch 814 and right notch 816 may form a channel that has a v-shape, a ∪-shape, a ⌑-shape, etc.

Figure 9:
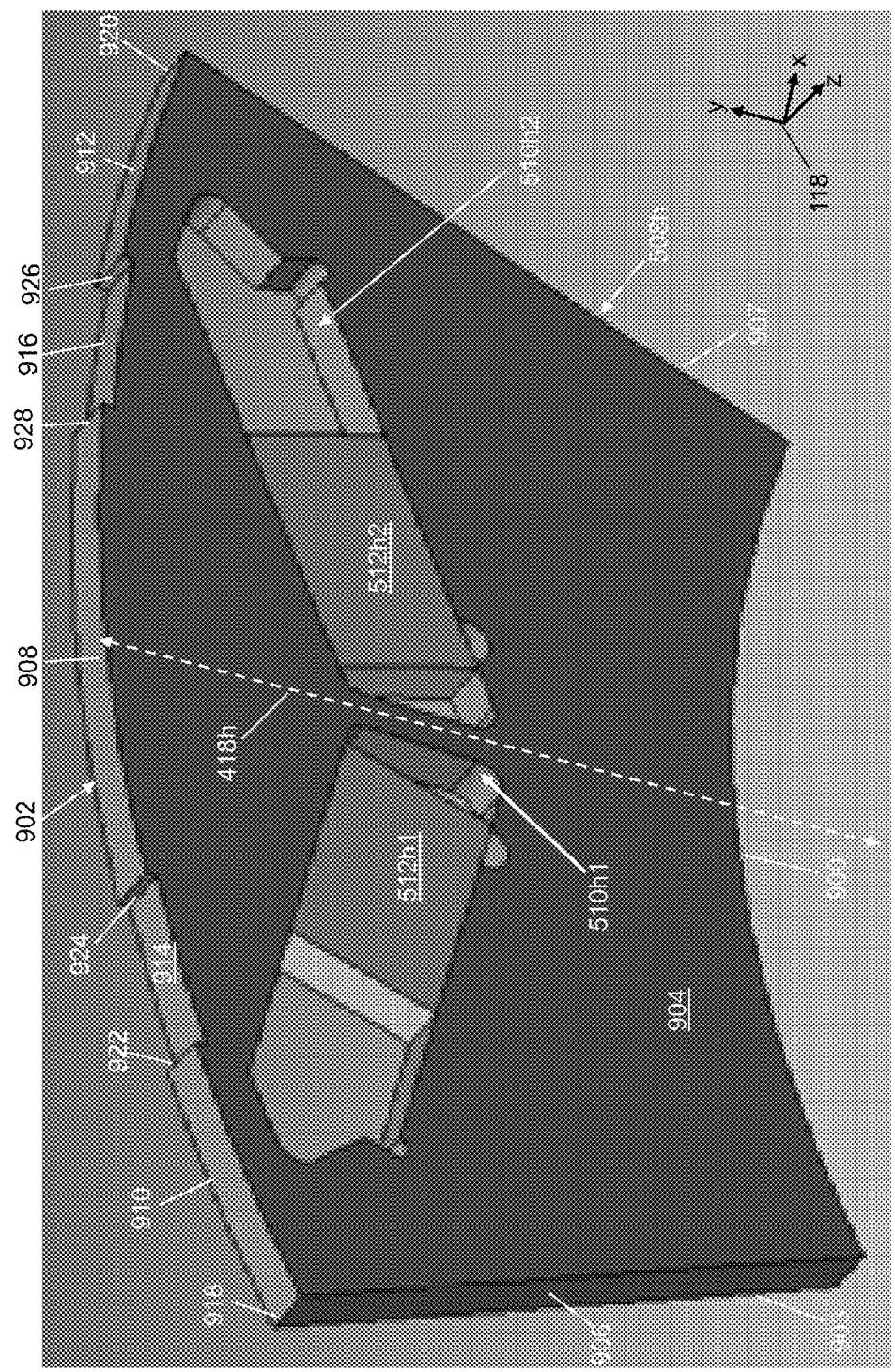
FIG. 9 shows a perspective view of an eighth rotor core stack portion of the portion of the electrical machine of FIG. 5 in accordance with an illustrative embodiment.

Referring to FIG. 9, a top, front perspective view of eighth rotor core stack portion 508$h$ is shown in accordance with an illustrative embodiment. Eighth rotor core stack portion 508$h$ may include a third front face 904, a fourth back face 903 (only an edge is visible), a fourth top face 902, a fourth bottom face 900, a fourth left side face 906, and a fourth right side face 907 (only an edge is visible). Fourth back face 903 faces in a direction opposite to fourth front face 904. Fourth top face 902, fourth bottom face 900, fourth left side face 906, and fourth right side face 907 extend between fourth front face 904 and fourth back face 903. Fourth front face 904, fourth back face 903, fourth left side face 906, and fourth right side face 907 are generally flat. Fourth front face 904 and fourth back face 903 have a truncated pie shape and are parallel to a plane defined by the x-y axes of x-y-z coordinate system 118. Fourth left side face 906 and fourth right side face 907 are generally rectangular and are parallel to a plane defined by the y-s axes of x-y-z coordinate system 118. Fourth top face 902 and fourth bottom face 900 curve radially about the z-axis of x-y-z coordinate system 118.

A seventh permanent magnet slot 510$h$1 is formed through fourth front face 904 and fourth back face 903 between fourth top face 902, fourth bottom face 900, fourth left side face 906 and fourth right side face 907. An eighth permanent magnet slot 510$h$2 is formed through fourth front face 904 and fourth back face 903 between fourth top face 902, fourth bottom face 900, fourth left side face 906, and fourth right side face 907. Seventh permanent magnet slot 510$h$1 and eighth permanent magnet slot 510$h$2 are arranged similar to first slot 404 and second slot 406 of the first pole portion of first rotor core stack 112$a$ shown with reference to FIG. 4. Seventh permanent magnet slot 510$h$1 and eighth permanent magnet slot 510$h$2 are mirror images of each other when rotated about a center radial axis 418$h$ of eighth rotor core stack portion 508$h$.

A seventh permanent magnet 512$h$1 and an eighth permanent magnet 512$h$2 are mounted in seventh permanent magnet slot 510$h$1 and eighth permanent magnet slot 510$h$2, respectively, similar to first v-arm permanent magnet 114$a$1 and second v-arm permanent magnet 114$a$2 shown with reference to FIG. 4. Seventh permanent magnet 512$h$1 and eighth permanent magnet 512$h$2 form a v-shaped permanent magnet structure.

Fourth top face 902 may include a top face center portion 908, a top face left portion 910, and a top face right portion 912 formed between fourth front face 904 and fourth back face 903. A left notch 914 is cut into fourth top face 902 between top face center portion 908 and top face left portion 910. A right notch 916 is cut into fourth top face 902 between top face center portion 908 and top face right portion 912. Left notch 914 may be formed by a first left notch wall 922 and a second left notch wall 924. Top face left portion 910 extends between first left notch wall 922 and a left edge 918. Right notch 916 may be formed by a first right notch wall 926 and a second right notch wall 928. Top face right portion 912 extends between first right notch wall 926 and a right edge 920. Top face center portion 908 extends between second left notch wall 924 and second right notch wall 928. Left notch 914 and right notch 916 have the same width and depth and shape. Left notch 914 and right notch 916 may form a channel that has a v-shape, a ∪-shape, a ⌑-shape, etc.

Depths of left notch 914 and right notch 916 of eighth rotor core stack portion 508$h$, left notch 914 and right notch 916 of seventh rotor core stack portion 508$g$, left notch 914 and right notch 916 of sixth rotor core stack portion 508$f$, and left notch 914 and right notch 916 of fifth rotor core stack portion 508$e$ may be the same or different.

Fourth rotor core stack portion 508$d$ and fifth rotor core stack portion 508$e$ can be referenced as a center rotor core portion with third rotor core portion 508$c$ referenced as a front rotor core portion mounted axially to fourth rotor core stack portion 508$d$ so that a front face of fourth rotor core stack portion 508$d$ mounts to a back face of third rotor core portion 508$c$ and with sixth rotor core portion 508$f$ may be referenced as a back rotor core portion mounted axially to fifth rotor core stack portion 508$e$ so that a front face of sixth rotor core portion 508$f$ mounts to a back face of fifth rotor core stack portion 508$e$, and so on adding identical stacks to the front and to the back of the previous stack in each direction, respectively.

Figure 19B:
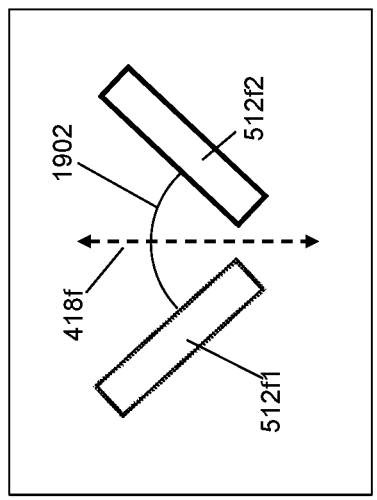
FIG. 19b shows a pole arc angle between a pair of permanent magnets of sixth rotor core stack portion of FIG. 7 in accordance with an illustrative embodiment.
Figure 19A:
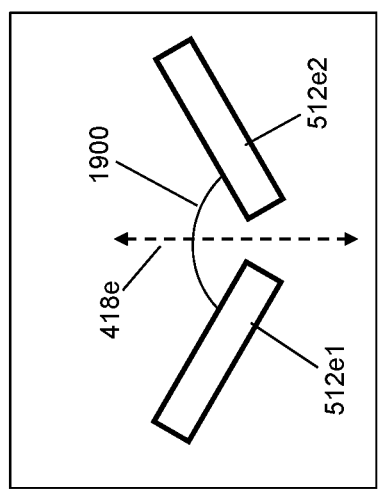
FIG. 19a shows a pole arc angle between a pair of permanent magnets of the fifth rotor core stack portion of FIG. 6 in accordance with an illustrative embodiment.

Referring to FIG. 19$a$, a first pole arc angle 1900 is shown between first permanent magnet 512$e$1 and second permanent magnet 512$e$2. Referring to FIG. 19$b$, a second pole arc angle 1902 is shown between third permanent magnet 512$f$1 and fourth permanent magnet 512$f$2. As discussed previously with reference to FIGS. 3$a$-3$e$, the permanent magnet structure associated with each pole portion may include one or more permanent magnets having different pole arc angles. For illustration, first pole arc angle 1900 is greater than second pole arc angle 1902.

Figure 10:
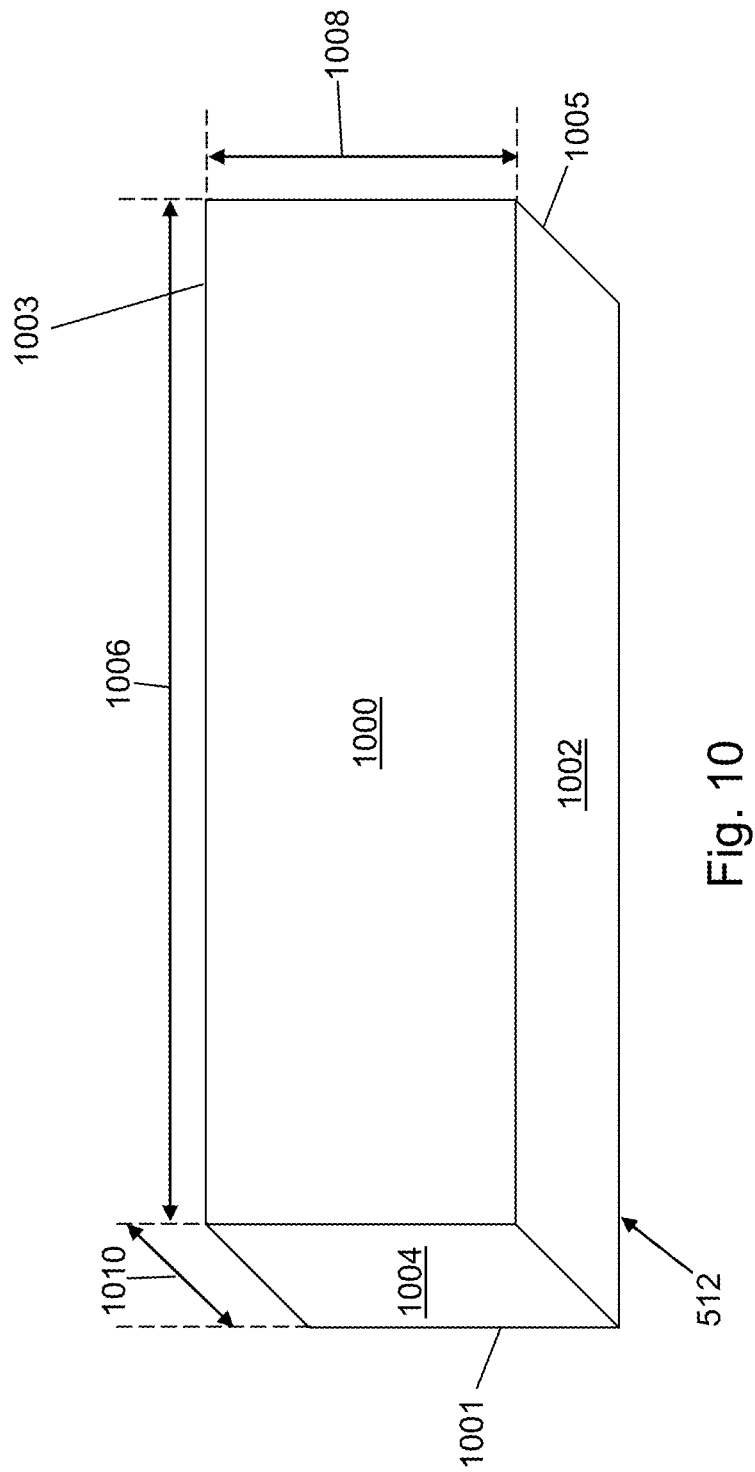
FIG. 10 shows a perspective view of a permanent magnet of the electrical machine of FIG. 5 in accordance with an illustrative embodiment.

Referring to FIG. 10, a permanent magnet 512 is shown in accordance with an illustrative embodiment. Permanent magnet 512 forms a rectangular box shape with a front face 1000, a back face 1001, a bottom face 1002, a top face 1003, a left side face 1004, and a right side face 1005. A width 1006 of permanent magnet 512 is defined between left side face 1004 and right side face 1005. A height 1008 of permanent magnet 512 is defined between bottom face 1002 and top face 1003. A length 1010 of permanent magnet 512 is defined between front face 1000 and back face 1001. When mounted in a slot, front face 1000 and back face 1001 are generally parallel with a front face of the pole portion and a back face of the pole portion, respectively.

Figure 11:
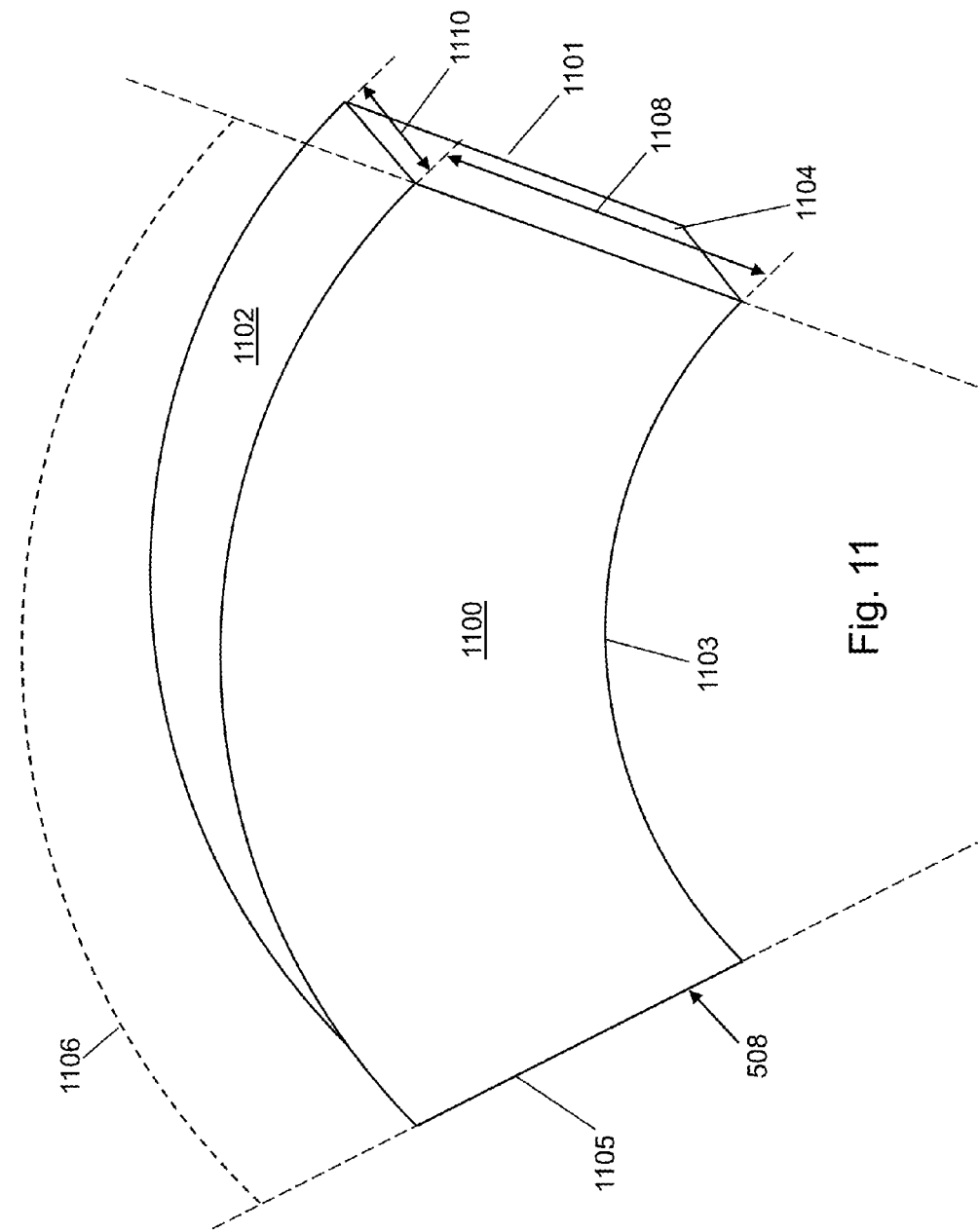
FIG. 11 shows a perspective view of a rotor core stack portion of the portion of the electrical machine of FIG. 5 in accordance with an illustrative embodiment.

Referring to FIG. 11, a rotor core stack portion 508 is shown in accordance with an illustrative embodiment. Rotor core stack portion 508 forms a truncated pie shaped box with a front face 1100, a back face 1101, a top face 1102, a bottom face 1103, a left side face 1105, and a right side face 1104. An arc width 1106 of rotor core stack portion 508 is defined between left side face 1105 and right side face 1104. A height 1108 of rotor core stack portion 508 is defined between top face 1102 and bottom face 1103. A length 1110 of rotor core stack portion 508 is defined between front face 1100 and back face 1101. A rotor includes a plurality of rotor core stack portions continuously formed together of circular laminations. Thus, left side face 1105 and right side face 1104 are shown here merely for discussion because the rotor stack portions are integrally formed together of the circular laminations.

Figure 12:
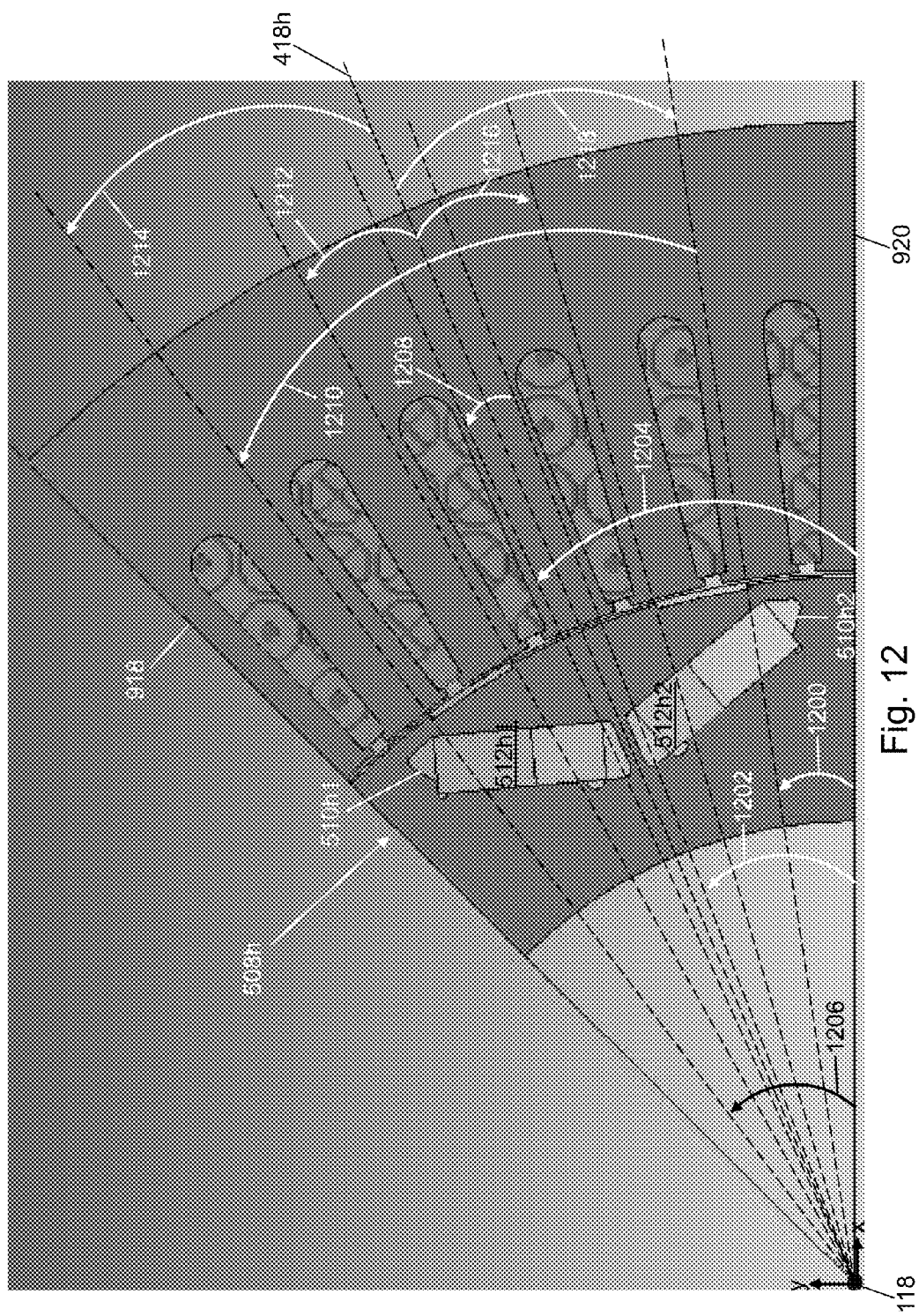
FIG. 12 shows a front view of the eighth rotor core stack portion of the portion of the electrical machine of FIG. 5 in accordance with an illustrative embodiment.

Referring to FIG. 12, a front side view of eighth rotor core stack portion 508h is shown in accordance with an illustrative embodiment. An upper flux angle 1200 of eighth permanent magnet 512h2 is defined. A lower flux angle 1202 of eighth permanent magnet 512h2 is defined. A lower flux angle 1204 of seventh permanent magnet 512h1 is defined. An upper flux angle 1206 of seventh permanent magnet 512h1 is defined. Upper flux angle 1200 and lower flux angle 1202 of eighth permanent magnet 512h2 are an upper bound and a lower bound of a d-axis PM flux of eighth permanent magnet 512h2 as understood by a person of skill in the art. Upper flux angle 1206 and lower flux angle 1204 of seventh permanent magnet 512h1 are an upper bound and a lower bound of a d-axis PM flux of seventh permanent magnet 512h1. A minimum flux angle 1208 is an angle between lower flux angle 1204 of seventh permanent magnet 512h1 and lower flux angle 1202 of eighth permanent magnet 512h2. A maximum flux angle 1210 is an angle between upper flux angle 1206 of seventh permanent magnet 512h1 and upper flux angle 1200 of eighth permanent magnet 512h2.

A first notch angle 1212 is defined relative to center radial axis 418h of eighth rotor core stack portion 508h. First notch angle 1212 defines an angular location of second left notch wall 924. A second notch angle 1214 is defined relative to center radial axis 418h of eighth rotor core stack portion 508h. Second notch angle 1214 defines an angular location of first left notch wall 922. A third notch angle 1216 is defined relative to center radial axis 418h of eighth rotor core stack portion 508h. Third notch angle 1216 defines an angular location of second right notch wall 928. A fourth notch angle 1218 is defined relative to center radial axis 418h of eighth rotor core stack portion 508h. Fourth notch angle 1218 defines an angular location of first right notch wall 926. First notch angle 1212 is equal to third notch angle 1216, and second notch angle 1214 is equal to fourth notch angle 1218. Second notch angle 1214 and fourth notch angle 1218 are further defined by maximum flux angle 1210.

For a particular stack, a general optimization for a proposed electrical machine design includes solution of an objective function $$\min_{\tau_{pmi}, d_{ni}, w_{pmi}, l_i} \left( \frac{T_{emRR}}{PMUF} \right)$$

where i is a stack number indicating a stack of the plurality of rotor core stack portions, $\tau_{pmi}$ is a permanent magnet (PM) pole arc angle in air gap 116 associated with the stack number, $d_{ni}$ is a depth of the left notch and the right notch associated with the stack number, $w_{pmi}$ is width 1006 of the permanent magnet associated with the stack number, $l_i$ is length 1010 associated with the stack number, $T_{emRR}$ is a torque ripple ratio defined as $T_{emRR} = T_{emRPP}/T_{emAvg} T_{emRPP}$ is a peak to peak magnitude of a ripple torque produced by the proposed electrical machine, $T_{emAvg}$ is an average ripple torque produced by the proposed electrical machine, and PMUF is a PM utilization factor defined as average torque divided by a mass of the PMs. PMUF quantitatively measures how efficiently PMs are used in the proposed electrical machine. Other objective functions can be based on weight, $T_e$/weight, torque ripple, rotor loss, efficiency, etc. The objective function may be selected by the designer based on a particular application for electric machine 100.

The objective function is solved subject to one or more constraints. For example, physical geometric boundary conditions for each optimization variable may constrain the solution:

$w_{pmi} \in [w_{pmn}, w_{pmx}]$ that constrains $w_{pmi}$ between a maximum, $w_{pmx}$, and a minimum, $w_{pmn}$, PM width 1006 that may be based on the material used, shape, configuration, etc. of the permanent magnet as well as a physical dimension of the proposed electrical machine;

$l_i \in [l_n, l_x]$ that constrains $l_i$ between a maximum, $l_x$, and a minimum, $l_n$, length 1110 that may be based on a physical dimension of the proposed electrical machine;

$\Sigma_i l_i = l_{Tx}$ that constrains a sum of each stack length to a maximum stack length, $l_{Tx}$, of the proposed electrical machine;

$d_{ni} \in [d_{nn}, d_{nx}]$ that constrains $d_{ni}$ between a maximum, $d_{nx}$, and a minimum, $d_{nn}$, depth that may be based on a ratio of a length, $d_g$, of air gap 116 such as $d_{ni} \in [0.5d_g, 3d_g]$;

$\tau_{pmi} \in [\tau_{pmn}, \tau_{pmx}]$ that constrains $\tau_{pmi}$ between maximum flux angle 1210, $\tau_{pmx}$, and minimum flux angle 1208, $\tau_{pmn}$.

Of course, the geometric boundary conditions depend on a specific electrical machine and can be defined in other ways depending on the design space for the proposed electrical machine.

Figure 13:
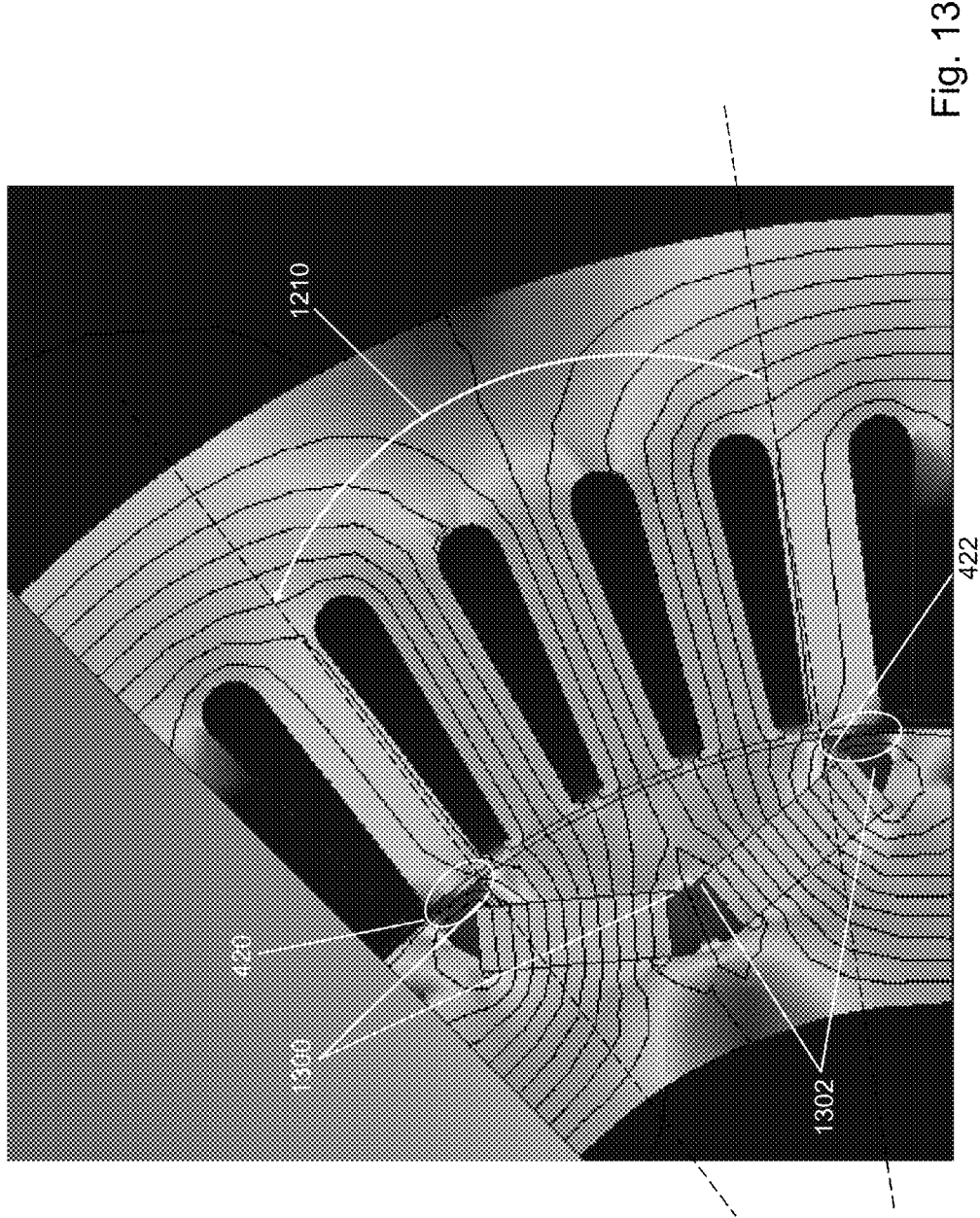
FIG. 13 shows a magnetic flux density field strength produced by only the permanent magnets of fifth rotor core stack portion of FIG. 6 in accordance with an illustrative embodiment.

Selection of maximum flux angle 1210, $\tau_{pmx}$, and minimum flux angle 1208, $\tau_{pmn}$ can be illustrated referring to FIG. 13, which shows a magnetic flux density field strength produced by only first permanent magnet 512e1 and second permanent magnet 512e2 of fifth rotor core stack portion 508e. First flux barriers 1300 are defined around first permanent magnet 512e1 due to the spacing in first permanent magnet slot 510e1. Second flux barriers 1302 are defined around second permanent magnet 512e2 due to the spacing in second permanent magnet slot 510e2. Maximum flux angle 1210, $\tau_{pmx}$, and minimum flux angle 1208, $\tau_{pmn}$ are bounded by first saturable bridge 420 and second saturable bridge 422 at which a magnetic field strength is at a high level. A magnetic field strength is low (e.g. approximately zero field strength) above first saturable bridge 420 and second saturable bridge 422, which defines the boundary of the d-axis PM flux in air gap 116 for the respective rotor core stack portion.

Figure 14:
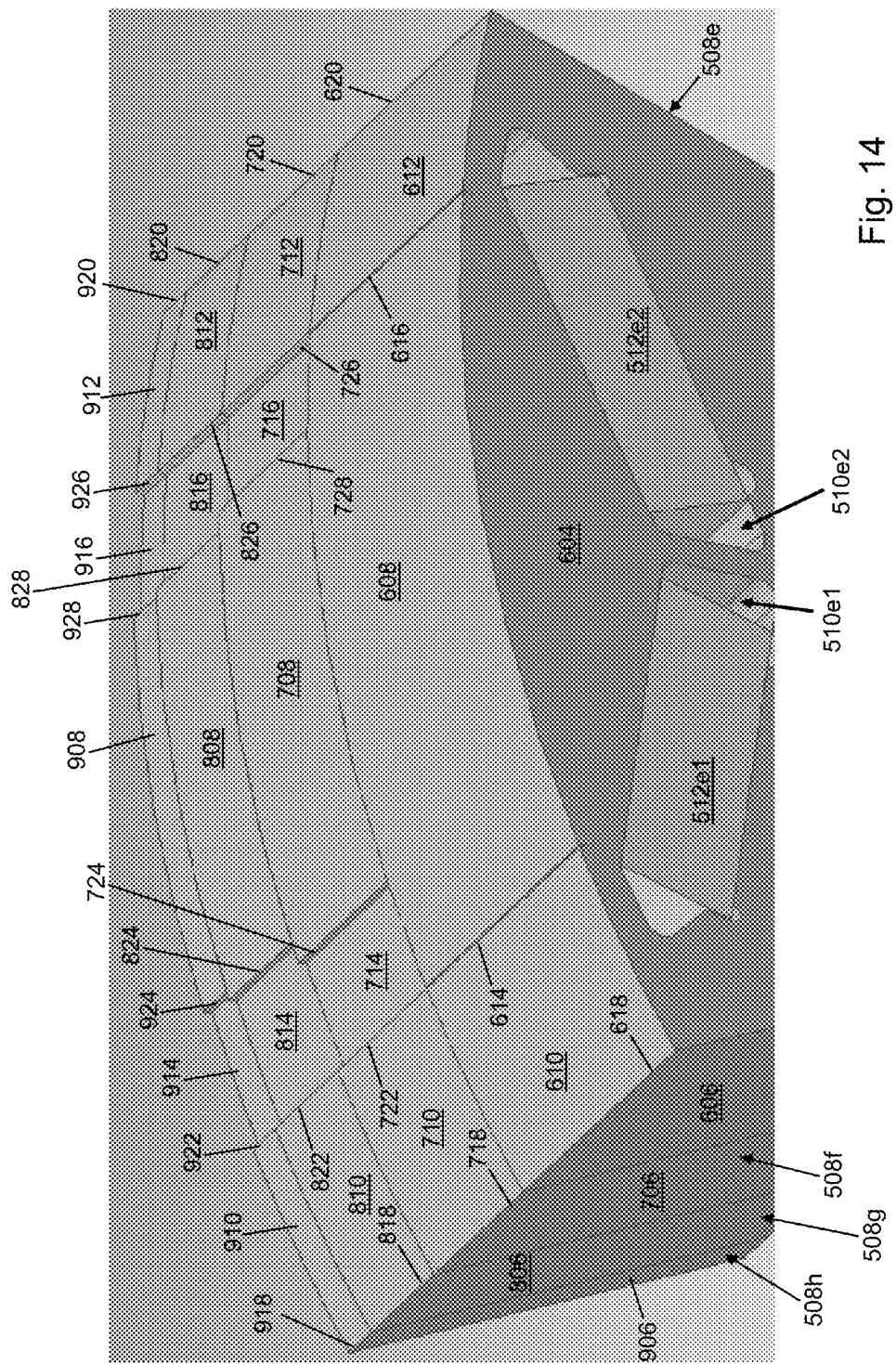
FIG. 14 shows a top, perspective view of the rotor core stack portions of FIGS. 6-9 mounted together in accordance with an illustrative embodiment.

Referring to FIG. 14, electrical machine pole portion 500 can be optimized based on optimization of half of electrical machine pole portion 500. Thus, the optimization can be based on analyzing 1/16 of electrical machine 100. First notch angle 1212 and third notch angle 1216 are defined by $\tau_{pmi}$ selected for each rotor core stack portion.

To further simplify the optimization, the number of parameters can be reduced. For example, in the illustrative embodiment of FIG. 5, $\tau_{pmi}$ can be defined as $$\tau_{pmi} = \frac{360}{P} - \left[ \frac{\alpha_U - \alpha_L}{w_{pmx} - w_{pmn}} (w_{pmi} - w_{pmx}) + \alpha_U \right]$$

to remove the objective function dimension for $w_{pmi}$. P is a number of poles of electrical machine 100, $\alpha_U$ is upper flux angle 1200, and $\alpha_L$ is lower flux angle 1202. As another example, $d_{ni}$ can defined as a constant value to remove the objective function dimension for $d_{ni}$. The resulting objective function determines optimum values for $\tau_{pmi}$ and $l_i$ for a specified range of numbers of stacks. For example, $i \in [2,4]$ may be defined for the objective function solved by evaluating half of the rotor stacks for a pole portion. The objective function reduces to $$\min_{\tau_{pmi}, l_i} \left( \frac{T_{emRR}}{PMUF} \right)$$

Figure 15:
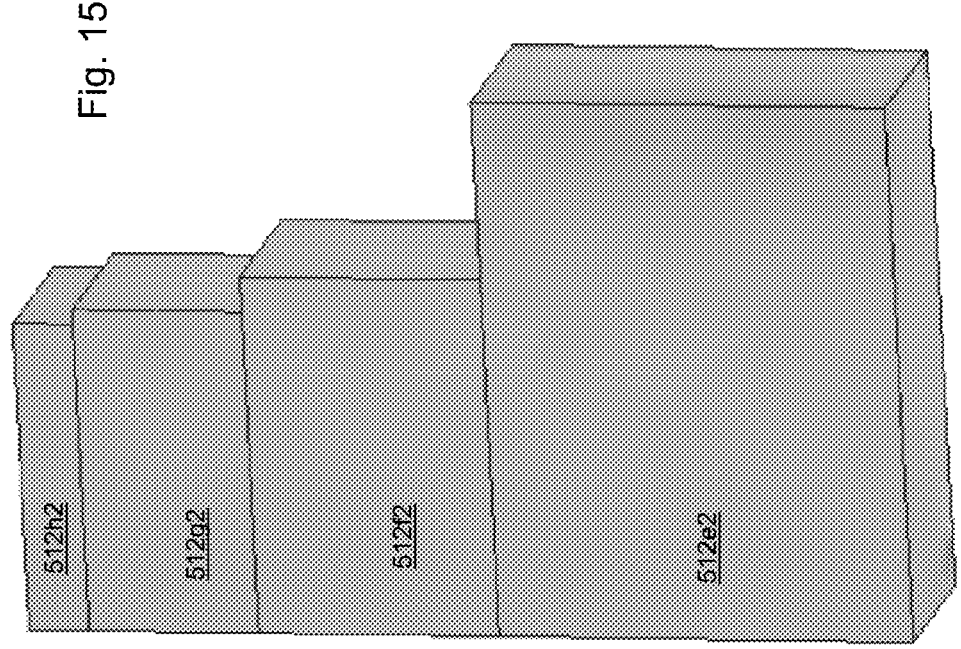
FIG. 15 shows a perspective view of permanent magnets of the rotor core stack portions of FIGS. 6-9 in accordance with an illustrative embodiment.

For illustration, FIG. 15 shows relative magnet dimensions for fifth rotor core stack portion 508e, sixth rotor core stack portion 508f, seventh rotor core stack portion 508g, and eighth rotor core stack portion 508h setting $d_{ni}=d_g$ for each rotor core stack portion. The objective of the optimization was to minimize the amount of PM material and the pulsating torque achieved by varying $w_{pmi}$ and $l_i$ for each stack. The optimization included a finite element (FE) solver to compute the instantaneous torque required for the objective function calculation. The variation of the PM width and stack length in the axial direction makes the electromagnetic problem three dimensional. The rotor design of FIG. 14 is similar to those machines with cooling ducts spaced along the axial core length. In that case, the torque acting on the shaft is approximated by the sum of the torque produced in all the divided rotor and stator portions. The 3D electromagnetic problem can be reduced to a two dimensional (2D) problem by simulating each rotor and stator stack with the same core length separately using a 2D FE method. Therefore, the total torque acting on the shaft is the sum of the torque produced by each individual stack, computed from 2D FE method. The reduction of the electromagnetic problem significant shortens the optimization time.

An additional constraint $T_{emAvg} \geq T_{emAvg}^L$ was used to ensure that the output torque was greater than a threshold value, $T_{emAvg}^L$. For example, the threshold value was defined as $T_{emAvg}^L = 0.9 T_{emAvg}^{Camry}$, where is $T_{emAvg}^{Camry}$ is an average output torque of the 2007 Camry Hybrid motor. The permanent magnet sizes were also limited to the slot sizes in the 2007 Camry Hybrid motor.

An edge of each permanent magnet is equidistant from, or aligned relative to, a pole axis 1500 that is parallel to the central axis. Height 1008e of first permanent magnet 512e1 of fifth rotor core stack portion 508e, height 1008f of first permanent magnet 512f1 of sixth rotor core stack portion 508f, height 1008g of first permanent magnet 512g1 of seventh rotor core stack portion 508g, and height 1008h of first permanent magnet 512h1 of eighth rotor core stack portion 508f were set equal to the value for the 2007 Camry Hybrid motor.

The optimum values for each length and width were determined. Length 1010e of first permanent magnet 512e1 of fifth rotor core stack portion 508e, length 1010f of first permanent magnet 512f1 of sixth rotor core stack portion 508f, length 1010g of first permanent magnet 512g1 of seventh rotor core stack portion 508g, and length 1010h of first permanent magnet 512h1 of eighth rotor core stack portion 508f were determined based on the optimization as 14.29 millimeters (mm), 8.30 mm, 5.84 mm, 2.07 mm, respectively. Width 1006e of first permanent magnet 512e1 of fifth rotor core stack portion 508e, width 1006f of first permanent magnet 512f1 of sixth rotor core stack portion 508f, width 1006g of first permanent magnet 512g1 of seventh rotor core stack portion 508g, and width 1006h of first permanent magnet 512h1 of eighth rotor core stack portion 508f were determined based on the optimization as 18.98 millimeters (mm), 12.66 mm, 11.39 mm, 10.88 mm, respectively.

For the electrical machine design shown in FIG. 15, the average torque was about 10% lower than that of the 2007 Camry Hybrid motor, but it uses 20% less PM material. The 10% torque reduction is due to the constraint $T_{emAvg}^L = 0.95 T_{emAvg}^{Camry}$.

Figure 16:
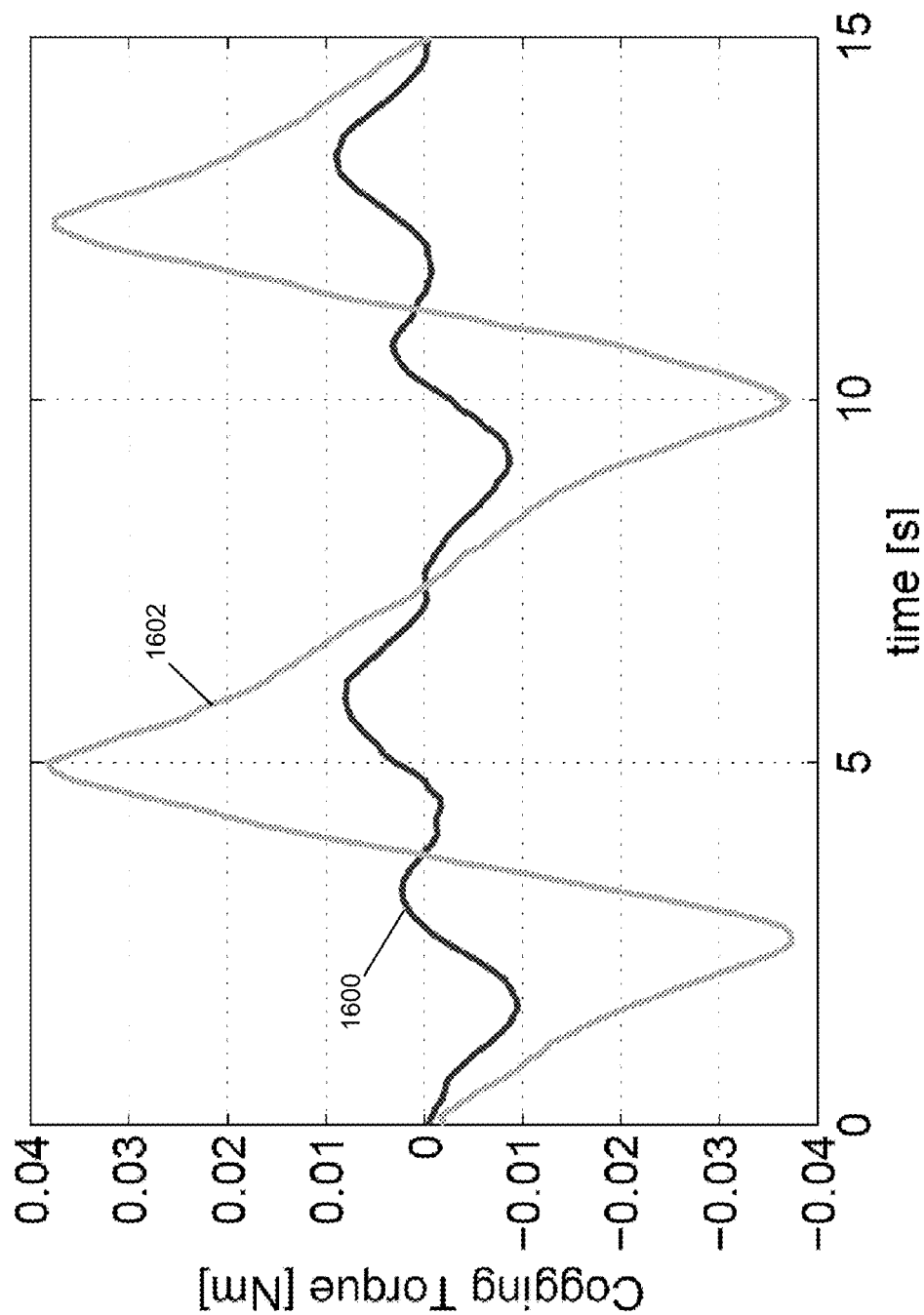
FIG. 16 shows a comparison of the cogging torque generated by the electrical machine design using the permanent magnet arrangement of the rotor core stack portions as illustrated in FIG. 15 and that generated by the 2007 Camry Hybrid motor.

As shown in FIG. 16, a cogging torque 1600 of the electrical machine design shown in FIG. 15 was significantly lower than a cogging torque 1602 of the Camry. The average torque was compromised to achieve the reduced pulsating torque and use of permanent magnet material. The pulsating torque was reduced because the cogging torque and the torque ripple were both reduced by 35% and 75%, respectively.

Figure 17:
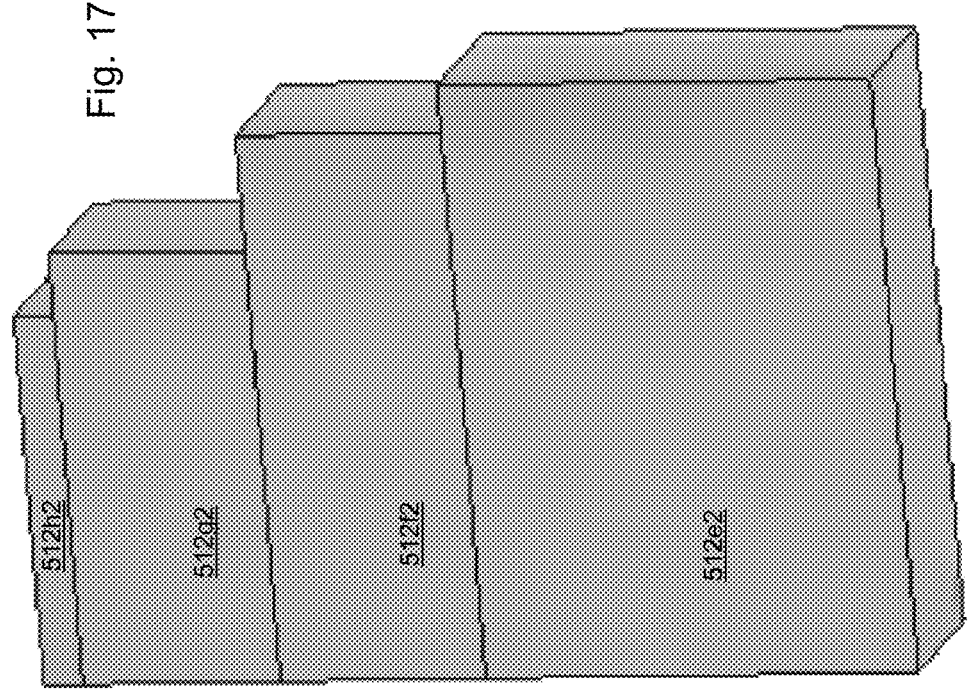
FIG. 17 shows a perspective view of permanent magnets of the rotor core stack portions of FIGS. 6-9 in accordance with a second illustrative embodiment.

As another example, FIG. 17 shows relative magnet dimensions for fifth rotor core stack portion 508e, sixth rotor core stack portion 508f, seventh rotor core stack portion 508g, and eighth rotor core stack portion 508h setting $d_{ni}=d_g$ for each rotor core stack portion for a second optimization problem. The additional constraint was defined as $T_{emAvg}^L = T_{emAvg}^{Camry}$, and the allowable permanent magnet size dimensions were increased.

The optimum values for each length and width were determined. Length 1010e of first permanent magnet 512e1 of fifth rotor core stack portion 508e, length 1010f of first permanent magnet 512f1 of sixth rotor core stack portion 508f, length 1010g of first permanent magnet 512g1 of seventh rotor core stack portion 508g, and length 1010h of first permanent magnet 512h1 of eighth rotor core stack portion 508f were determined based on the optimization as 15.08 millimeters (mm), 7.17 mm, 6.86 mm, 1.39 mm, respectively. Width 1006e of first permanent magnet 512e1 of fifth rotor core stack portion 508e, width 1006f of first permanent magnet 512f1 of sixth rotor core stack portion 508f, width 1006g of first permanent magnet 512g1 of seventh rotor core stack portion 508g, and width 1006h of first permanent magnet 512h1 of eighth rotor core stack portion 508f were determined based on the optimization as 20.98 millimeters (mm), 19.32 mm, 15.24 mm, 13.07 mm, respectively.

Figure 18:
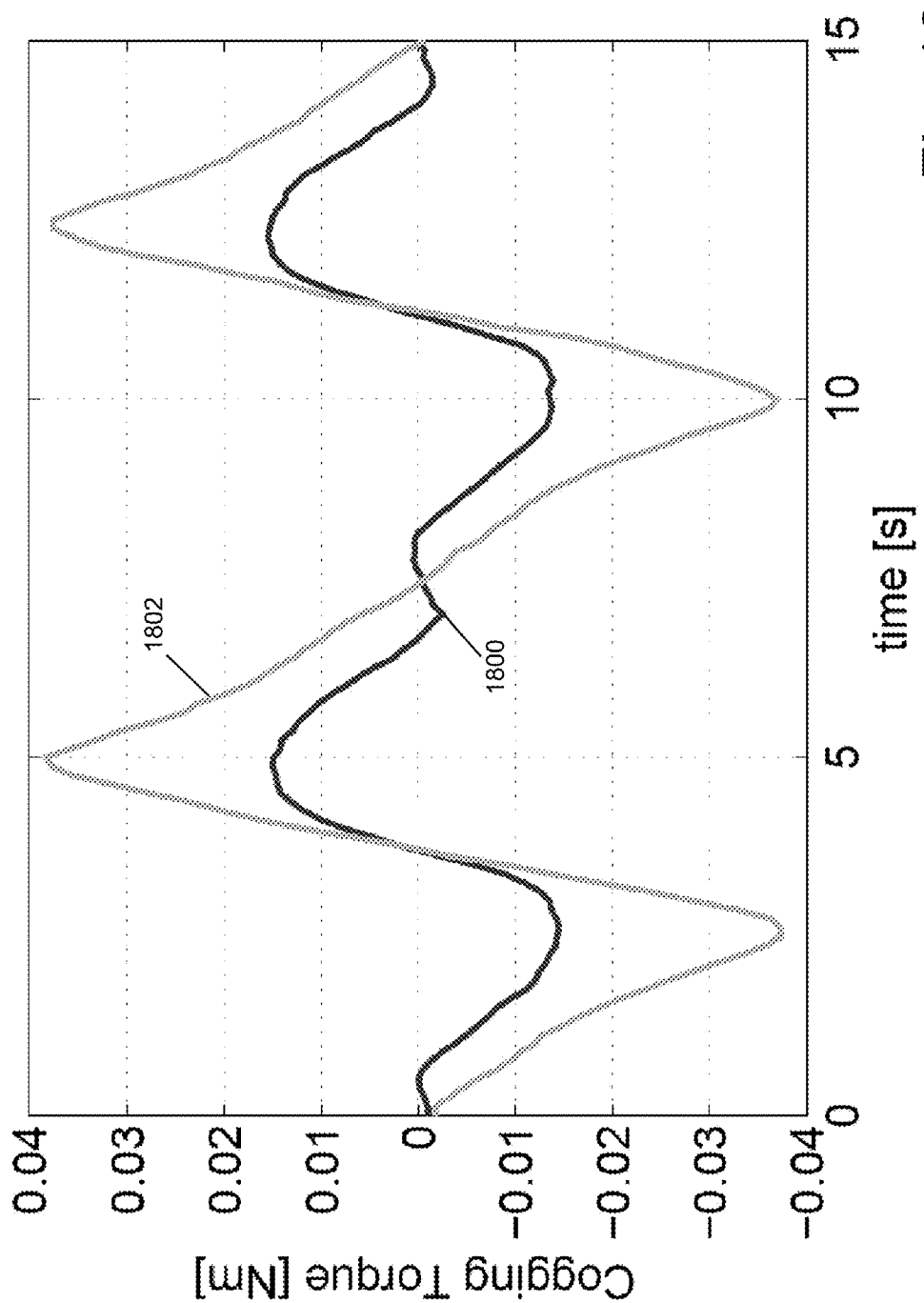
FIG. 18 shows a comparison of the cogging torque generated by the electrical machine design using the permanent magnet arrangement of the rotor core stack portions as illustrated in FIG. 17 and that generated by the 2007 Camry Hybrid motor.

For the electrical machine design shown in FIG. 17, the average torque was about the same as 2007 Camry Hybrid motor, but it used only 1% less PM material. As shown in FIG. 18, a cogging torque 1800 of the electrical machine design shown in FIG. 17 was significantly lower than a cogging torque 1802 of the Camry. The pulsating torque was reduced because the cogging torque and the torque ripple were both reduced by 63% and 43%, respectively.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, in the detailed description, using "and" or "or" is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A rotor of an electrical machine comprising:
a plurality of pole portions that form a cylinder with a center axial core, wherein a central axis is defined through a center of the center axial core, wherein the pole portions are distributed circumferentially equally around the center axial core, wherein each pole portion comprises
a center rotor core portion comprising a first front face, a first back face, a first top face, and a first bottom face, wherein the first back face faces in a direction opposite to the first front face, wherein a first plurality of slots is formed through the first front face and the first back face between the first top face and the first bottom face;
a back rotor core portion comprising a second front face, a second back face, a second top face, and a second bottom face, wherein the second back face faces in a direction opposite to the second front face, wherein a second plurality of slots is formed through the second front face and the second back face between the second top face and the second bottom face; and
a front rotor core portion comprising a third front face, a third back face, a third top face, and a third bottom face, wherein the third back face faces in a direction opposite to the third front face, wherein a third plurality of slots is formed through the third front face and the third back face between the third top face and the third bottom face;
wherein the front rotor core portion is mounted to the center rotor core portion axially so that the third back face mounts to the first front face;
wherein the back rotor core portion is mounted to the center rotor core portion axially so that the first back face mounts to the second front face;
a first permanent magnet mounted in a first slot of the first plurality of slots of each pole portion;
a second permanent magnet mounted in a first slot of the second plurality of slots of each pole portion; and
a third permanent magnet mounted in a first slot of the third plurality of slots of each pole portion;
a fourth permanent magnet mounted in a second slot of the first plurality of slots of each pole portion to form a first mirror image of the first slot of the first plurality of slots of each pole portion relative to a first center radial plane of a respective pole portion that is perpendicular to the central axis and extends through a first center of the first front face of the respective pole portion;
a fifth permanent magnet mounted in a second slot of the second plurality of slots of each pole portion to form a second mirror image of the first slot of the second plurality of slots of each pole portion relative to a second center radial plane of the respective pole portion that is perpendicular to the central axis and extends through a second center of the second front face of the respective pole portion;
a sixth permanent magnet mounted in a second slot of the third plurality of slots of each pole portion to form a third mirror image of the first slot of the third plurality of slots of each pole portion relative to a third center radial plane of the respective pole portion that is perpendicular to the central axis and extends through a third center of the third front face of the respective pole portion;
wherein a maximum length of the first permanent magnet that is parallel to the central axis is greater than twice a maximum length of the second permanent magnet that is parallel to the central axis;
wherein the maximum length of the second permanent magnet is equal to a maximum length of the third permanent magnet that is parallel to the central axis;
wherein the first center, the second center, and the third center are aligned relative to a pole axis of each pole portion that is parallel to the central axis, wherein a first minimum distance between the first permanent magnet of the respective pole portion and the first center is equal to a second minimum distance between the second permanent magnet of the respective pole portion and the second center, and the first distance is equal to a third minimum distance between the third permanent magnet of the respective pole portion and the third center;
wherein a maximum width of the first permanent magnet that is parallel to the first center radial plane is greater than a maximum width of the second permanent magnet that is parallel to the second center radial plane;
wherein the maximum width of the second permanent magnet is equal to a maximum width of the third permanent magnet that is parallel to the third center radial plane.

2. The rotor of claim 1, wherein the first permanent magnet, the second permanent magnet, and the third permanent magnet have a common polarity.

3. The rotor of claim 1, wherein a pole arc angle between the first permanent magnet and the fourth permanent magnet, between the second permanent magnet and the fifth permanent magnet, and between the third permanent magnet and the sixth permanent magnet is 180 degrees, wherein the first permanent magnet and the fourth permanent magnet form a single continuous magnet, wherein the second permanent magnet and the fifth permanent magnet form a single continuous magnet, wherein the third permanent magnet and the sixth permanent magnet form a single continuous magnet.

4. The rotor of claim 1, wherein the first slot, the second slot, and the third slot have a same size and shape.

5. The rotor of claim 1, wherein at least one air gap is formed between the first permanent magnet and the first slot.

6. The rotor of claim 1, wherein a pole arc angle between the first permanent magnet and the fourth permanent magnet is less than 180 degrees and greater than 90 degrees.

7. The rotor of claim 1, wherein a first pole arc angle between the first permanent magnet and the fourth permanent magnet, a second pole arc angle between the second permanent magnet and the fifth permanent magnet, and a third pole arc angle between the third permanent magnet and the sixth permanent magnet are equal.

8. The rotor of claim 1, wherein the first slot, the second slot, the third slot, the fourth slot, the fifth slot, and the sixth slot have a same size and shape.

9. The rotor of claim 1, further comprising:
a seventh permanent magnet; and
an eighth permanent magnet;
wherein each pole portion further comprises
a second back rotor core portion comprising a fourth front face, a fourth back face, a fourth top face and a fourth bottom face, wherein the fourth back face faces in a direction opposite to the fourth front face, wherein a fourth plurality of slots is formed through the fourth front face and the fourth back face between the fourth top face and the fourth bottom face; and a second front rotor core portion comprising a fifth front face, a fifth back face, a fifth top face and a fifth bottom face, wherein the fifth back face faces in a direction opposite to the fifth front face, wherein a fifth plurality of slots is formed through the fifth front face and the fifth back face between the fifth top face and the fifth bottom face;

wherein the second front rotor core portion is mounted to the front rotor core portion axially so that the fifth back face mounts to the third front face;

wherein the second back rotor core portion is mounted to the back rotor core portion axially so that the second back face mounts to the fourth front face;

wherein the seventh permanent magnet is mounted in a first slot of the fourth plurality of slots of each pole portion;

wherein the eighth permanent magnet is mounted in a first slot of the fifth plurality of slots of each pole portion;

a ninth permanent magnet mounted in a second slot of the fourth plurality of slots of each pole portion to form a fourth mirror image of the first slot of the fourth plurality of slots of each pole portion relative to a fourth center radial plane of the respective pole portion that is perpendicular to the central axis and extends through a fourth center of the fourth front face of the respective pole portion;

a tenth permanent magnet mounted in a second slot of the fifth plurality of slots of each pole portion to form a fifth mirror image of the first slot of the fifth plurality of slots of each pole portion relative to a fifth center radial plane of the respective pole portion that is perpendicular to the central axis and extends through a fifth center of the fifth front face of the respective pole portion;

wherein a maximum length of the seventh permanent magnet that is parallel to the central axis is less than the maximum length of the second permanent magnet;

wherein the maximum length of the seventh permanent magnet is equal to a maximum length of the eighth permanent magnet that is parallel to the central axis;

wherein the fourth permanent magnet and the fifth permanent magnet are aligned relative to the pole axis of each pole portion.

10. The rotor of claim 9, wherein a maximum width of the seventh permanent magnet that is parallel to the fourth center radial plane is less than a maximum width of the second permanent magnet; wherein the maximum width of the seventh permanent magnet is equal to a maximum width of the eighth permanent magnet that is parallel to the fifth center radial plane.

11. The rotor of claim 1, wherein a maximum height of the first permanent magnet that is in a plane that is perpendicular to the central axis and to the first center radial plane is greater than or equal to a maximum height of the second permanent magnet that is in the plane that is perpendicular to the central axis and to the second center radial plane; wherein the maximum height of the second permanent magnet is equal to a maximum height of the third permanent magnet that is in the plane that is perpendicular to the central axis and to the third center radial plane.

12. The rotor of claim 1, wherein a pole arc angle between the first permanent magnet and the fourth permanent magnet is greater than a pole arc angle between the second permanent magnet and the fifth permanent magnet; wherein the pole arc angle of the second permanent magnet is equal to a pole arc angle between the third permanent magnet and the sixth permanent magnet, wherein each pole arc angle is measured relative to a respective center radial plane.

13. The rotor of claim 1, wherein a first notch and a second notch are formed in the second top face between the second front face and the second back face;

wherein a third notch and a fourth notch are formed in the third top face between the third front face and the third back face;

wherein the first notch is located between a first angle and a second angle relative to the first center radial plane of each pole portion;

wherein the second notch is located between the first angle and the second angle on a side opposite the first center radial plane of each pole portion;

wherein the third notch is located between a third angle and a fourth angle relative to the second center radial plane of each pole portion;

wherein the fourth notch is located between the third angle and the fourth angle on a side opposite the second center radial plane of each pole portion.

14. The rotor of claim 13, wherein the second angle is greater than the first angle; wherein the fourth angle is greater than the third angle; wherein the first angle and the third angle are equal and selected based on a flux range of the second permanent magnet and the third permanent magnet, respectively.

15. The rotor of claim 14, wherein the second angle is selected based on a location of a first saturable bridge formed between the first slot of the second plurality of slots and the second top face; wherein the fourth angle is selected based on a location of a second saturable bridge formed between the first slot of the third plurality of slots and the third top face.

16. The rotor of claim 9, wherein a first notch and a second notch are formed in the second top face between the second front face and the second back face;

wherein a third notch and a fourth notch are formed in the third top face between the third front face and the third back face;

wherein the first notch is located between a first angle and a second angle relative to the second center radial plane of each pole portion;

wherein the second notch is located between the first angle and the second angle on a side opposite the second center radial plane of each pole portion;

wherein the third notch is located between a third angle and a fourth angle relative to the third center radial plane of each pole portion;

wherein the fourth notch is located between the third angle and the fourth angle on a side opposite the third center radial plane of each pole portion;

wherein a fifth notch and a sixth notch are formed in the fourth top face between the fourth front face and the fourth back face;

wherein a seventh notch and an eighth notch are formed in the fifth top face between the fifth front face and the fifth back face;

wherein the fifth notch is located between a fifth angle and a sixth angle relative to the fourth center radial plane of each pole portion;

wherein the sixth notch is located between the fifth angle and the sixth angle on a side opposite the fourth center radial plane of each pole portion;

wherein the seventh notch is located between a seventh angle and an eighth angle relative to the fifth center radial plane of each pole portion;

wherein the eighth notch is located between the seventh angle and the eighth angle on a side opposite the fifth center radial plane of each pole portion.

17. The rotor of claim 16, wherein the second angle is greater than the first angle;

wherein the fourth angle is greater than the third angle;

wherein the first angle and the third angle are equal and selected based on a flux range of the second permanent magnet and the third permanent magnet, respectively;

wherein the sixth angle is greater than the fifth angle;

wherein the eighth angle is greater than the seventh angle;

wherein the fifth angle and the seventh angle are equal and selected based on a flux range of the seventh permanent magnet and the eighth permanent magnet, respectively.

18. The rotor of claim 17, wherein the second angle is selected based on a location of a first saturable bridge formed between the first slot of the second plurality of slots and the second top face;

wherein the fourth angle is selected based on a location of a second saturable bridge formed between the first slot of the third plurality of slots and the third top face;

wherein the sixth angle is selected based on a location of a third saturable bridge formed between the first slot of the fourth plurality of slots and the fourth top face;

wherein the fourth angle is selected based on a location of a fourth saturable bridge formed between the first slot of the fifth plurality of slots and the fifth top face.

19. An electrical machine comprising:

a rotor comprising a plurality of pole portions that form a cylinder with a center axial core, wherein a central axis is defined through a center of the center axial core, wherein the pole portions are distributed circumferentially equally around the center axial core, wherein each pole portion comprises a center rotor core portion comprising a first front face, a first back face, a first top face, and a first bottom face, wherein the first back face faces in a direction opposite to the first front face, wherein a first plurality of slots is formed through the first front face and the first back face between the first top face and the first bottom face;

a back rotor core portion comprising a second front face, a second back face, a second top face, and a second bottom face, wherein the second back face faces in a direction opposite to the second front face, wherein a second plurality of slots is formed through the second front face and the second back face between the second top face and the second bottom face; and a front rotor core portion comprising a third front face, a third back face, a third top face, and a third bottom face, wherein the third back face faces in a direction opposite to the third front face, wherein a third plurality of slots is formed through the third front face and the third back face between the third top face and the third bottom face;

wherein the front rotor core portion is mounted to the center rotor core portion axially so that the third back face mounts to the first front face;

wherein the back rotor core portion is mounted to the center rotor core portion axially so that the first back face mounts to the second front face;

a first permanent magnet mounted in a first slot of the first plurality of slots of each pole portion;

a second permanent magnet mounted in a first slot of the second plurality of slots of each pole portion; and a third permanent magnet mounted in a first slot of the third plurality of slots of each pole portion;

a fourth permanent magnet mounted in a second slot of the first plurality of slots of each pole portion to form a first mirror image of the first slot of the first plurality of slots of each pole portion relative to a first center radial plane of a respective pole portion that is perpendicular to the central axis and extends through a first center of the first front face of the respective pole portion;

a fifth permanent magnet mounted in a second slot of the second plurality of slots of each pole portion to form a second mirror image of the first slot of the second plurality of slots of each pole portion relative to a second center radial plane of the respective pole portion that is perpendicular to the central axis and extends through a second center of the second front face of the respective pole portion;

a sixth permanent magnet mounted in a second slot of the third plurality of slots of each pole portion to form a third mirror image of the first slot of the third plurality of slots of each pole portion relative to a third center radial plane of the respective pole portion that is perpendicular to the central axis and extends through a third center of the third front face of the respective pole portion;

wherein a maximum length of the first permanent magnet that is parallel to the central axis is greater than twice a maximum length of the second permanent magnet that is parallel to the central axis;

wherein the maximum length of the second permanent magnet is equal to a maximum length of the third permanent magnet that is parallel to the central axis;

wherein the first center, the second center, and the third center are aligned relative to a pole axis of each pole portion that is parallel to the central axis, wherein a first minimum distance between the first permanent magnet of the respective pole portion and the first center is equal to a second minimum distance between the second permanent magnet of the respective pole portion and the second center, and the first distance is equal to a third minimum distance between the third permanent magnet of the respective pole portion and the third center;

wherein a maximum width of the first permanent magnet that is parallel to the first center radial plane is greater than a maximum width of the second permanent magnet that is parallel to the second center radial plane;

wherein the maximum width of the second permanent magnet is equal to a maximum width of the third permanent magnet that is parallel to the third center radial plane; and a stator comprising a plurality of teeth about which windings are wound, wherein the stator is mounted radially relative to the first top face, the second top face, and the third top face of each pole portion, wherein an air gap separates the plurality of teeth from the first top face, the second top face, and the third top face of each pole portion.

20. The electrical machine of claim 19, wherein a maximum height of the first permanent magnet that is in a plane that is perpendicular to the central axis and to the first center radial plane is greater than or equal to a maximum height of the second permanent magnet that is in the plane that is perpendicular to the central axis and to the second center radial plane; wherein the maximum height of the second permanent magnet is equal to a maximum height of the third permanent magnet that is in the plane that is perpendicular to the central axis and to the third center radial plane.

\* \* \* \* \*